United States Patent
Kasamatsu et al.

(10) Patent No.: US 9,927,759 B2
(45) Date of Patent: Mar. 27, 2018

(54) POWER SUPPLY DEVICE FOR SUPPRESSING CROSS REGULATION AND IMAGE FORMING APPARATUS INCLUDING POWER SUPPLY DEVICE

(71) Applicant: Konica Minolta, Inc., Chiyoda-ku, Tokyo (JP)

(72) Inventors: Toru Kasamatsu, Toyokawa (JP); Mikiyuki Aoki, Toyohashi (JP); Kouei Cho, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/441,382

(22) Filed: Feb. 24, 2017

(65) Prior Publication Data
US 2017/0261910 A1    Sep. 14, 2017

(30) Foreign Application Priority Data
Mar. 11, 2016 (JP) .................................. 2016-048405

(51) Int. Cl.
| | |
|---|---|
| H02M 3/335 | (2006.01) |
| G03G 15/00 | (2006.01) |
| H02M 1/08 | (2006.01) |
| H02M 1/42 | (2007.01) |
| H02M 1/00 | (2006.01) |

(52) U.S. Cl.
CPC .............. *G03G 15/80* (2013.01); *H02M 1/08* (2013.01); *H02M 1/4208* (2013.01); *H02M 3/33561* (2013.01); *H02M 3/33592* (2013.01); *H02M 2001/008* (2013.01); *H02M 2001/009* (2013.01)

(58) Field of Classification Search
CPC ...... G03G 15/80; H02M 1/08; H02M 1/4208; H02M 3/33561; H02M 3/33592; H02M 2001/008; H02M 2001/009
See application file for complete search history.

(56) References Cited

U.S. PATENT DOCUMENTS

| | | | | |
|---|---|---|---|---|
| 5,905,491 A | * | 5/1999 | Kim .................... | H02M 1/4225 345/212 |
| 6,490,178 B1 | * | 12/2002 | Asayama .......... | H02M 3/33538 363/21.06 |
| 7,173,720 B2 | * | 2/2007 | Nishizawa .............. | H02J 9/005 347/5 |

FOREIGN PATENT DOCUMENTS

| | | |
|---|---|---|
| JP | 2003-319649 A | 11/2003 |
| JP | 2007-037379 A | 2/2007 |

* cited by examiner

*Primary Examiner* — Emily P Pham
(74) *Attorney, Agent, or Firm* — Buchanan Ingersoll & Rooney PC

(57) ABSTRACT

A first rectification circuit includes a bypass element connected to both ends of a rectification element. The bypass element is smaller in voltage drop amount than the rectification element. A power supply device is configured to perform switching between a first mode and a second mode based on at least one of information showing a magnitude of electric power that is being supplied to a load and information showing a magnitude of electric power that is to be supplied to the load. In the first mode, an AC voltage is rectified in a path including the rectification element. In the second mode, the AC voltage is rectified in a path including the bypass element.

12 Claims, 15 Drawing Sheets

FIG.3A
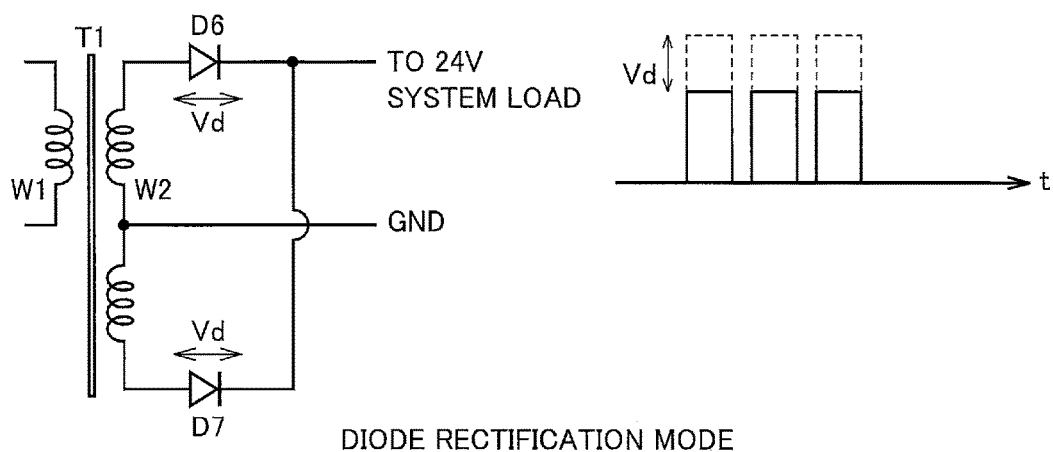
DIODE RECTIFICATION MODE
FIG.3B
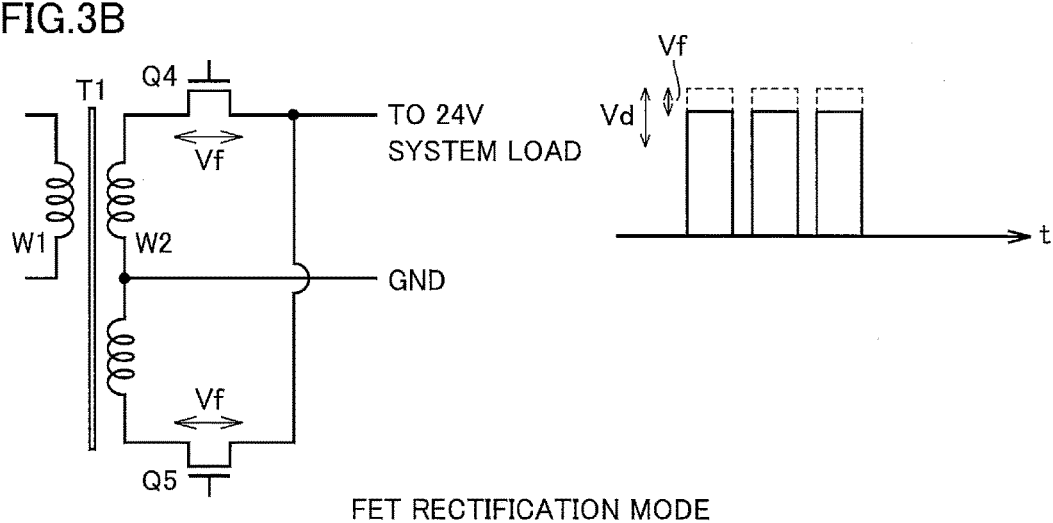
FET RECTIFICATION MODE
FIG.3C
|  | VOLTAGE DROP | CONTROL |
| --- | --- | --- |
| DIODE RECTIFICATION MODE | LARGE | NOT REQUIRED |
| FET RECTIFICATION MODE | SMALL | REQUIRED |

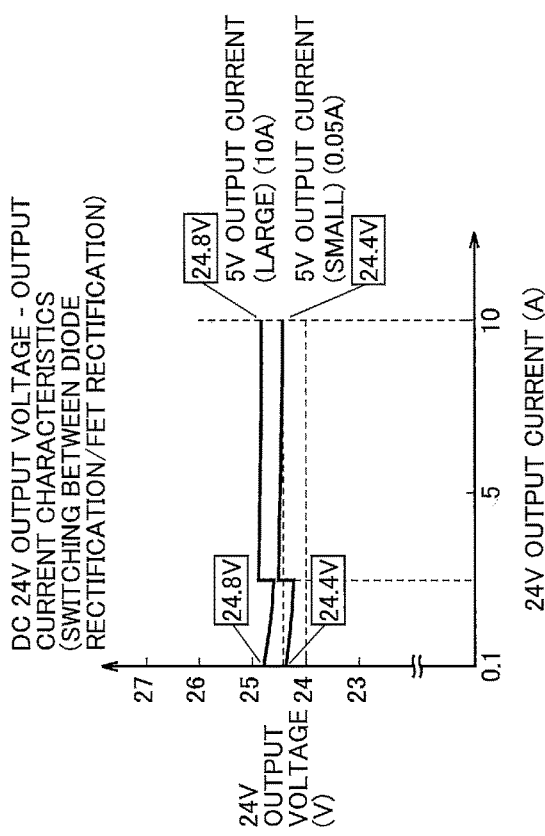
FIG.4A
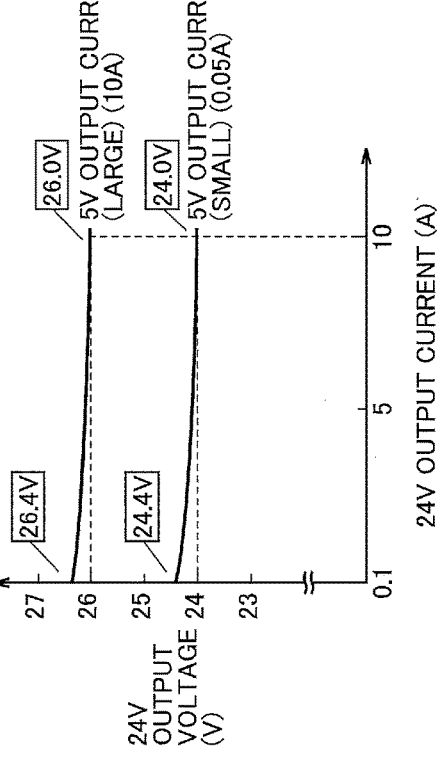
FIG.4B
FIG.4C
| 5V OUTPUT CURRENT | SMALL (0.05A) | | | | LARGE (10A) | | | |
|---|---|---|---|---|---|---|---|---|
| 24V OUTPUT CURRENT | SMALL (0.1A) | | LARGE (10A) | | SMALL (0.1A) | | LARGE (10A) | |
| FET RECTIFICATION MODE IN 5V SYSTEM | NONE | | NONE | | NONE | | NONE | |
| FET RECTIFICATION MODE IN 24V SYSTEM | OFF | OFF | OFF | ON | ON | OFF | ON | ON |
| 24V OUTPUT VOLTAGE | 24.4V | 24.4V | 24V | 24.4V | 26.4V | 24.8V | 26V | 24.8V |

FIG.5

ONLY DIODE RECTIFICATION MODE

| 5V OUTPUT CURRENT | SMALL(0.05A) | | LARGE(10A) | | FLUCTUATION WIDTH OF 24V OUTPUT VOLTAGE |
|---|---|---|---|---|---|
| 24V OUTPUT CURRENT | SMALL (0.1A) | LARGE (10A) | SMALL (0.1A) | LARGE (10A) | |
| FET RECTIFICATION MODE IN 5V SYSTEM | NONE | NONE | NONE | NONE | |
| FET RECTIFICATION MODE IN 24V SYSTEM | | | | | |
| 24V OUTPUT VOLTAGE | 24.4V | 24V | 26.4V | 26V | 2.4V |

EFFECTIVE ONLY IN FET RECTIFICATION MODE IN 5V SYSTEM

| 5V OUTPUT CURRENT | SMALL(0.05A) | | LARGE(10A) | | FLUCTUATION WIDTH OF 24V OUTPUT VOLTAGE |
|---|---|---|---|---|---|
| 24V OUTPUT CURRENT | SMALL (0.1A) | LARGE (10A) | SMALL (0.1A) | LARGE (10A) | |
| FET RECTIFICATION MODE IN 5V SYSTEM | OFF | OFF | ON | ON | |
| FET RECTIFICATION MODE IN 24V SYSTEM | OFF | OFF | OFF | OFF | |
| 24V OUTPUT VOLTAGE | 24.4V | 24V | 24.8V | 24.4V | 0.8V |

EFFECTIVE ONLY IN FET RECTIFICATION MODE IN 24V SYSTEM

| 5V OUTPUT CURRENT | SMALL(0.05A) | | LARGE(10A) | | FLUCTUATION WIDTH OF 24V OUTPUT VOLTAGE |
|---|---|---|---|---|---|
| 24V OUTPUT CURRENT | SMALL (0.1A) | LARGE (10A) | SMALL (0.1A) | LARGE (10A) | |
| FET RECTIFICATION MODE IN 5V SYSTEM | OFF | OFF | OFF | OFF | |
| FET RECTIFICATION MODE IN 24V SYSTEM | OFF | ON | OFF | ON | |
| 24V OUTPUT VOLTAGE | 24.4V | 24.4V | 26.4V | 25.6V | 2.0V |

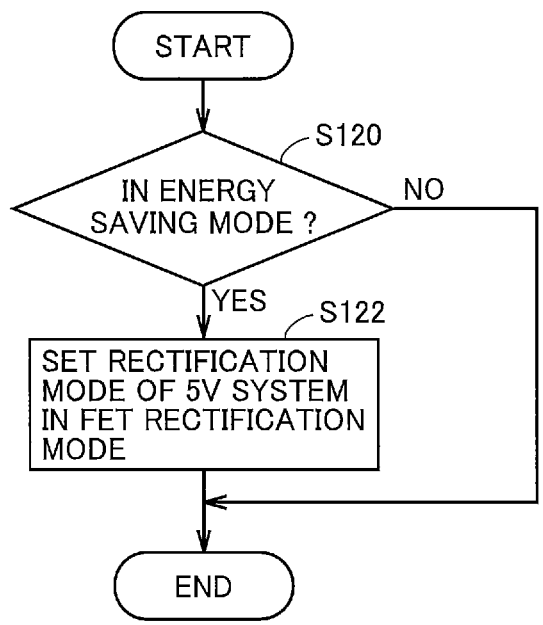

POWER SUPPLY DEVICE FOR SUPPRESSING CROSS REGULATION AND IMAGE FORMING APPARATUS INCLUDING POWER SUPPLY DEVICE

This application is based on Japanese Patent Application No. 2016-048405 filed with the Japan Patent Office on Mar. 11, 2016, the entire content of which is hereby incorporated by reference.

BACKGROUND OF THE INVENTION

Field of the Invention

The present disclosure relates to a power supply device, and more particularly to a switching power supply device including a transformer having a plurality of secondary windings.

Description of the Related Art

There are some multiple output-type switching power supplies including a transformer having a plurality of secondary windings, in which feedback control is performed so as to set only a specific output at a fixed voltage in order to implement a simple configuration. However, it is known that cross regulation occurs, in which the voltage output from a power supply system and not constant-voltage controlled is to fluctuate in accordance with the fluctuation in the load connected to the output of this power supply system or the outputs of other power supply systems.

With regard to the technique for suppressing this cross regulation, Japanese Laid-Open Patent Publication No. 2007-37379 discloses a configuration in which current control means is connected between the first direct-current (DC) output terminal that is fed-back and the second DC output terminal that is not fed-back, and a constant ratio of the second DC output voltage is connected to the input terminal of a differential amplifier based on the first DC output voltage as a reference, in which state the conduction state of the current control means is controlled by the output from the differential amplifier, thereby suppressing a sudden rise of the second DC output voltage caused by influences or the like of the magnetic flux leakage (leakage) from the transformer on the light load conditions during which the load current of the second DC output voltage is relatively small.

From the viewpoint of energy saving, Japanese Laid-Open Patent Publication No. 2003-319649 discloses a multi-output type switching power supply device having a configuration in which a field effect transistor (FET) that is lower in ON voltage than a diode is used in a synchronous rectification circuit, and a synchronous rectification control circuit turns off the FET of the synchronous rectification circuit in the energy saving mode that is set after the completion of the operation mode, thereby interrupting the current in the synchronous rectification circuit.

SUMMARY OF THE INVENTION

However, the technique disclosed in Japanese Laid-Open Patent Publication No. 2007-37379 employs a dummy resistance for causing a bleeder current to flow from the second DC output voltage terminal to the first DC output voltage terminal during the light load conditions, so that electric power loss occurs due to this resistance. Consequently, the efficiency as a power supply device may deteriorate.

On the other hand, the technique disclosed in Japanese Laid-Open Patent Publication No. 2003-319649 does not require a dummy resistance connection between the outputs, so that electric power consumption in this resistance can be avoided. However, the above-mentioned technique does not employ the control for the purpose of suppressing fluctuations (cross regulation) of the output voltage that is not fed-back.

The present disclosure has been made to solve the above-described problems. An object in a certain aspect is to provide a multiple output-type switching power supply device allowing suppression of cross regulation and highly improved in efficiency.

A power supply device includes: a transformer including a primary winding and a plurality of secondary windings, an oscillator circuit including a switching element electrically connected to the primary winding, the oscillator circuit being configured to apply an alternating-current (AC) voltage generated by a switching operation of the switching element to the primary winding; and a plurality of rectification circuits electrically connected to the plurality of secondary windings, respectively. Each of the plurality of rectification circuits includes a rectification element configured to rectify an AC voltage induced in a corresponding one of the plurality of secondary windings for supplying the rectified AC voltage to a corresponding load. The plurality of rectification circuits include a first rectification circuit having a bypass element connected to both ends of the rectification element, the bypass element being smaller in voltage drop amount during conduction than the rectification element. The power supply device further includes: a first control unit configured to control the switching operation of the switching element in the oscillator circuit based on a signal associated with a magnitude of a voltage supplied from one of the plurality of rectification circuits to a corresponding load; and a switching unit configured to perform switching between a first mode and a second mode. In the first mode, an AC voltage induced in one of the plurality of secondary windings corresponding to the first rectification circuit is rectified in a path including the rectification element. In the second mode, the AC voltage induced in one of the plurality of secondary windings corresponding to the first rectification circuit is rectified in a path including the bypass element. The switching unit is configured to perform switching from the first mode to the second mode upon satisfaction of a condition based on at least one of information showing a magnitude of electric power that is being supplied from each of the plurality of rectification circuits to a corresponding load and information showing a magnitude of electric power that is to be supplied from each of the plurality of rectification circuits to a corresponding load.

In a certain aspect, the power supply device further includes a current detection device configured to detect a magnitude of a current that is being supplied to a corresponding load from the first rectification circuit. The switching unit is configured to perform switching from the first mode to the second mode when a value of a current detected by the current detection device exceeds a prescribed current value.

In a certain aspect, the power supply device further includes a voltage detection device configured to detect a signal associated with the magnitude of the voltage that is being supplied to a corresponding load from a rectification circuit different from a rectification circuit corresponding to a load for which the first control unit controls a voltage to be supplied. The switching unit is configured to perform switching from the first mode to the second mode when a value of a voltage detected by the voltage detection device is lower than a prescribed voltage value.

In a certain aspect, the first control unit includes a PWM control unit configured to control the switching element to be turned on and off by outputting a pulse width modulation (PWM) signal to the switching element. The first control unit is configured to perform switching from the first mode to the second mode when a duty ratio of the PWM signal exceeds a prescribed duty ratio.

In a certain aspect, the power supply device further includes a frequency detection device configured to detect a switching frequency of the switching element. The switching unit is configured to perform switching from the first mode to the second mode when a frequency detected by the frequency detection device exceeds a prescribed frequency.

In a certain aspect, each of the loads includes a device configured to perform an operation according to an instruction. Based on information about a device included in a load corresponding to the first rectification circuit among the loads each responding to the instruction, the switching unit is configured to perform switching between the first mode and the second mode before the device included in the load responding to the instruction performs the operation according to the instruction.

In a certain aspect, the power supply device further includes a resonance capacitor connected in series to the primary winding. In a certain aspect, a converter including the transformer and the oscillator circuit is a flyback-type converter. In a certain aspect, the power supply device further includes a power factor correction circuit configured to boost a DC voltage and output the boosted DC voltage to the oscillator circuit.

In a certain aspect, at least one rectification circuit of the plurality of rectification circuits that is different from a rectification circuit corresponding to a load for which the first control unit controls a voltage to be supplied includes a Zener diode that is reverse-connected between output voltages, and an element configured to interrupt an output path in response to conduction of the Zener diode.

According to another aspect, a power supply device included in an image forming apparatus includes: a transformer including a primary winding and a plurality of secondary windings; an oscillator circuit including a switching element electrically connected to the primary winding, the oscillator circuit being configured to apply an AC voltage generated by a switching operation of the switching element to the primary winding; and a plurality of rectification circuits electrically connected to the plurality of secondary windings, respectively. Each of the plurality of rectification circuits has a rectification element configured to rectify an AC voltage induced in a corresponding one of the plurality of secondary windings for supplying the rectified AC voltage to a corresponding load. The plurality of rectification circuits include a first rectification circuit having a bypass element connected to both ends of the rectification element, the bypass element being smaller in voltage drop amount during conduction than the rectification element. The power supply device further includes: a first control unit configured to control the switching operation of the switching element in the oscillator circuit based on a signal associated with a magnitude of a voltage supplied from one of the plurality of rectification circuits to a corresponding load; and a switching unit configured to perform switching between a first mode and a second mode. In the first mode, an AC voltage induced in one of the plurality of secondary windings corresponding to the first rectification circuit is rectified in a path including the rectification element. In the second mode, the AC voltage induced in one of the plurality of secondary windings corresponding to the first rectification circuit is rectified in a path including the bypass element. The switching unit is configured to perform switching from the first mode to the second mode upon satisfaction of a condition based on at least one of information showing a magnitude of electric power that is being supplied from each of the plurality of rectification circuits to a corresponding load and information showing a magnitude of electric power that is to be supplied from each of the plurality of rectification circuits to a corresponding load.

In a certain aspect, the voltage supplied to a load corresponding to the first rectification circuit is equal to or less than a voltage supplied to a load corresponding to each of the plurality of rectification circuits other than the first rectification circuit. The power supply device is configured to be capable of implementing an energy saving mode in which electric power is supplied only to the load corresponding to the first rectification circuit. The switching unit is configured to perform control by the second mode in the energy saving mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram for illustrating a diode rectification mode according to the first embodiment.

FIG. 3B is a diagram for illustrating an FET rectification mode according to the first embodiment.

FIG. 3C is a diagram showing a comparison between the diode rectification mode and the FET rectification mode according to the first embodiment.

FIG. 4A is a diagram (first) for illustrating suppression of cross regulation by switching of the rectification mode.

FIG. 4B is a diagram (second) for illustrating suppression of cross regulation by switching of the rectification mode.

FIG. 4C is a diagram (third) for illustrating suppression of cross regulation by switching of the rectification mode.

FIG. 5 is a diagram showing a comparison of fluctuations in a 24V output voltage among the case where only the diode rectification mode is used, the case where the FET rectification mode is used only at a 5V system secondary AC voltage, and the case where the FET rectification mode is used only at a 24V system secondary AC voltage.

FIG. 15 is a flowchart illustrating the control in an energy saving mode according to a modification.

DESCRIPTION OF THE PREFERRED EMBODIMENTS

Figure 1:
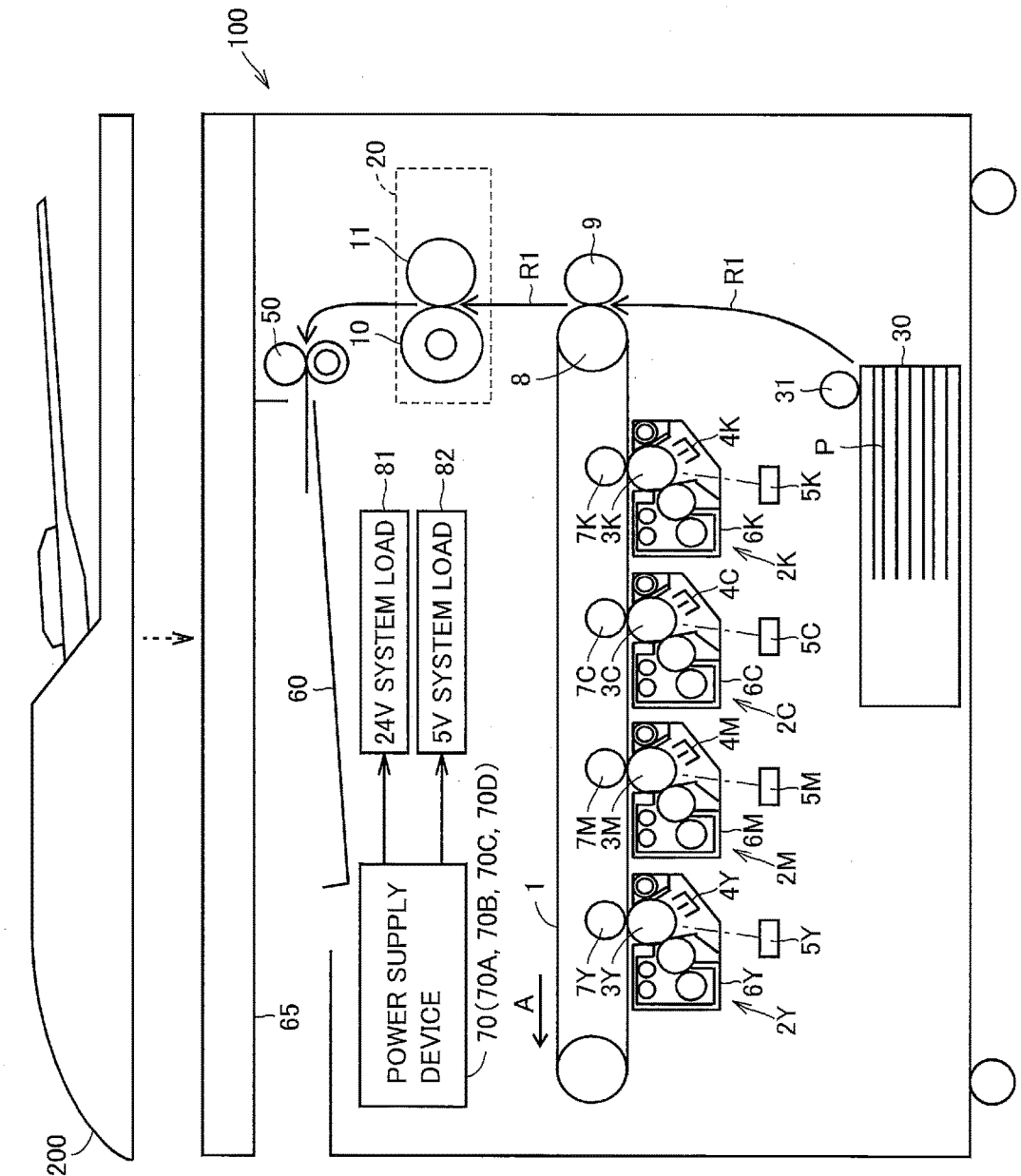
FIG. 1 is a diagram illustrating an example of the configuration of an image forming apparatus according to an embodiment.

In the following, embodiments of the present invention will be hereinafter described in detail with reference to the accompanying drawings. In addition, the same or corresponding components in the drawings are designated by the same reference characters, and description thereof will not be repeated.

A. First Embodiment: Control Based on Load Current

In the following first to fifth embodiments, an explanation will be given with regard to the configuration and control in a multiple output-type switching power supply device for suppressing cross regulation based on at least one of information showing the magnitude of electric power that is being supplied to each of loads or information showing the magnitude of electric power that is to be later supplied to each of loads.

Examples of the information showing the magnitude of electric power includes a current value, a voltage value, a duty ratio in Pulse Width Modulation (PWM) control, an oscillation frequency in Pulse Frequency Modulation (PFM) control, and the like. In the first embodiment, an explanation will be given with regard to the configuration and control for suppressing cross regulation based on a current value as an example of the information showing the magnitude of electric power.

(a1. Image Forming Apparatus 100)

FIG. 1 is a diagram illustrating an example of the configuration of an image forming apparatus 100 according to the first embodiment. Referring to FIG. 1, image forming apparatus 100 includes an intermediate transfer belt 1 as a belt member in its approximately center portion on the inside thereof. Below the lower horizontal portion of intermediate transfer belt 1, four image forming units 2Y, 2M, 2C, and 2K corresponding to colors of yellow (Y), magenta (M), cyan (C), and black (K), respectively, are arranged side by side along intermediate transfer belt 1. Also, four image forming units 2Y, 2M, 2C, and 2K include photoreceptor drums 3Y, 3M, 3C, and 3K, respectively.

Charging units 4Y, 4M, 4C, and 4K; print head units 5Y, 5M, 5C, and 5K; developing units 6Y, 6M, 6C, and 6K; and primary transfer rollers 7Y, 7M, 7C, and 7K are arranged sequentially around photoreceptor drums 3Y, 3M, 3C, and 3K, respectively, so as to extend in the rotation direction of their respective drums. Primary transfer rollers 7Y, 7M, 7C, and 7K are located to face photoreceptor drums 3Y, 3M, 3C, and 3K, respectively, across intermediate transfer belt 1.

A secondary transfer roller 9 is pressed to contact a portion of intermediate transfer belt 1 that is supported by an intermediate transfer belt driving roller 8. In a region of this portion, secondary transfer is carried out. At the downstream position of a conveying path R1 in the rearward of the secondary transfer region, a fixing device 20 having a fixing roller 10 and a pressurizing roller 11 is arranged.

A sheet supply cassette 30 is arranged below image forming apparatus 100 in an attachable/detachable manner. A stack of sheets P loaded and housed within sheet supply cassette 30 is to be fed one by one from the topmost sheet of the stack into conveying path R1 in accordance with rotation of a paper feeding roller 31.

In the present embodiment, power supply device 70 is connected to a 24V system load 81 and a 5V system load 82, by way of example. In this case, 24V system load 81 is a drive system such as a motor and may be a motor for driving the driving roller 8 by way of example. Also, 5V system load 82 is a CPU (Central Processing Unit), a sensor or the like, and may be a control unit 90 described later by way of example.

Power supply device 70 supplies electric power to a load performing an operation according to a user's instruction. For example, power supply device 70 supplies electric power to each device such as fixing device 20 and an automatic document feeder 200 provided as an external device. A scanner 65 serves as an image reading unit configured to read a document to generate image data. The present example provides a power supply device in the image forming apparatus, but the present invention is not limited thereto. In another aspect, by way of example, the present invention may be a power supply device used for an LED lighting device and configured to receive an input of an instruction for lighting an LED.

In addition, image forming apparatus 100 employs an intermediate transfer system including a plurality of image forming units (2Y, 2M, 2C, 2K) by way of example, but the present invention is not limited thereto. The image forming apparatus may include a single image forming unit or may employ a rotary system. In another aspect, the image forming apparatus may form an image by the so-called ink jet system.

(a2. Power Supply Device 70)

Figure 2:
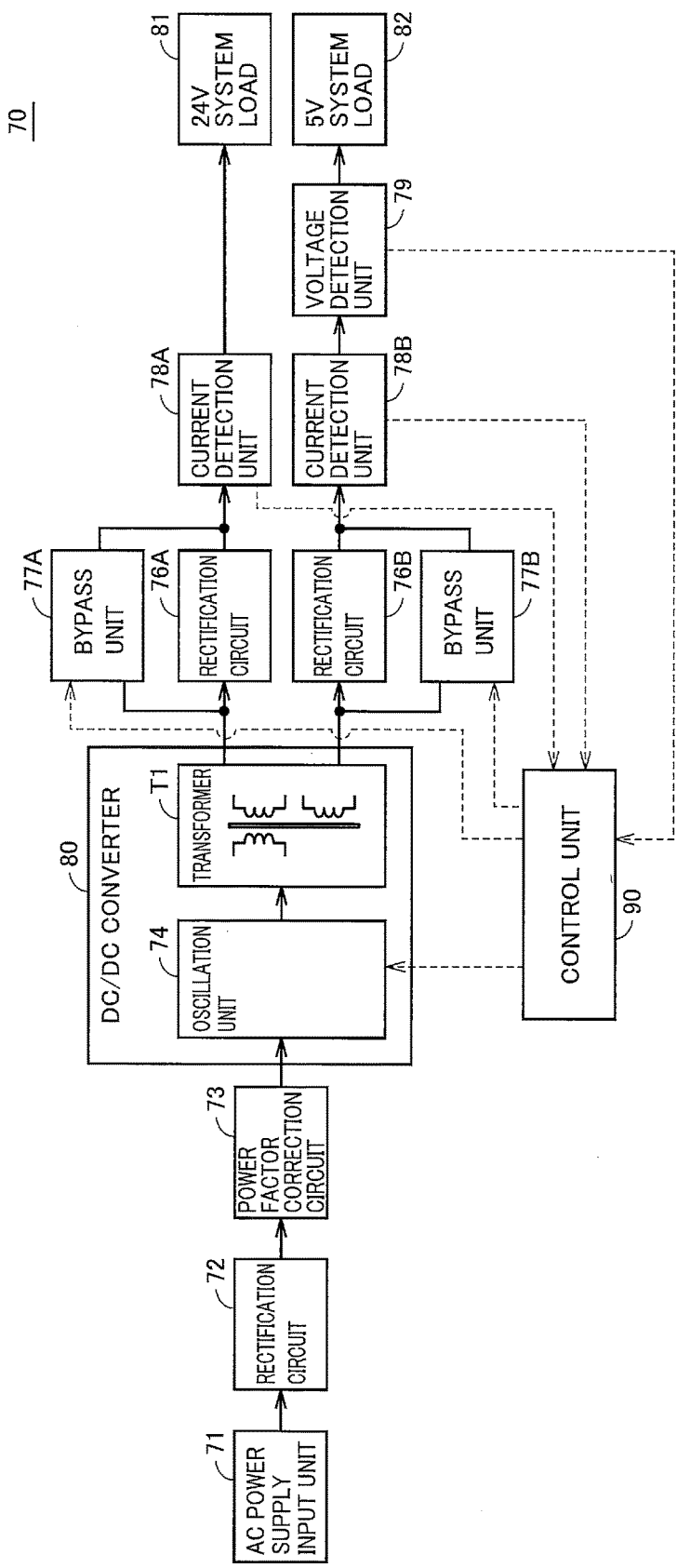
FIG. 2 is a block diagram illustrating an example of the basic configuration of a power supply device according to the first embodiment.

In the following, a power supply device 70 according to the present embodiment will be described. FIG. 2 is a block diagram illustrating the basic configuration of power supply device 70 according to the first embodiment.

Power supply device 70 includes an AC power supply input unit 71, a rectification circuit 72, a power factor correction circuit 73, a DC/DC converter 80, rectification circuits 76A and 76B, bypass units 77A and 77B, current detection units 78A and 78B, a voltage detection unit 79, and a control unit 90. DC/DC converter 80 includes an oscillation unit 74 and a transformer 75.

Rectification circuit 72 is connected to AC power supply input unit 71, and configured to convert the AC voltage of AC power supply input unit 71 into a DC voltage.

Power factor correction circuit 73 boosts the DC voltage output from rectification circuit 72. More specifically, power factor correction circuit 73 controls the current waveform output from rectification circuit 72 so as not to include a harmonic component, thereby improving a power factor and also implementing smoothing.

DC/DC converter 80 converts the DC voltage output from power factor correction circuit 73 into a prescribed voltage, and supplies the converted DC voltage to each of 24V system load 81 and 5V system load 82. More specifically, the AC voltage generated by the switching operation of the switching element included in oscillation unit 74 is applied to transformer T1. Transformer T1 has two secondary windings. In these secondary windings, AC voltages in accordance with their respective winding ratios are induced.

Control unit 90 is electrically connected to each of oscillation unit 74, bypass units 77A and 77B, current detection units 78A and 78B, and voltage detection unit 79. Control unit 90 controls the switching operation of the switching element included in oscillation unit 74 such that the value of the voltage detected by voltage detection unit 79 becomes 5V, in other words, such that the voltage applied to 5V system load 82 becomes a 5V constant voltage. This is because 5V system load 82 is generally narrower in input voltage acceptable range than 24V system load 81, and therefore required to output a voltage with high accuracy. In the present embodiment, control unit 90 controls the switching operation of oscillation unit 74 by PWM for regulating the ON/OFF duty ratio.

On the other hand, the output of the 24V system is not constant-voltage controlled. Accordingly, the magnitude of the voltage supplied to the 24V system load is to fluctuate when fluctuations occur in 24V system load 81 and 5V system load 82. If the output voltage of the 24V system largely fluctuates (cross regulation), a device having a relatively wide input voltage acceptable range should be used as 24V system load 81, which poses a problem of increased cost. In view of the above, an explanation will be hereinafter given with regard to the control for improving such cross regulation characteristics (the output voltage fluctuation on the side where constant voltage control is not carried out).

(a3. Suppression of Cross Regulation)

Rectification circuits 76A and 76B each include a rectification element. By way of example, a diode is provided as a rectification element. Each of bypass units 77A and 77B includes a switching element connected to both ends of a corresponding one of the rectification elements. By way of example, a switching elements used for each of bypass units 77A and 77B may be an FET.

Control unit 90 is configured such that it can perform switching between two types of rectification modes including a diode rectification mode and an FET rectification mode. In the diode rectification mode, the secondary voltage induced in each of the secondary windings of transformer T1 is rectified in a path including rectification circuits 76A and 76B. In the FET rectification mode, the secondary voltage induced in each of the secondary windings of transformer T1 is rectified in a path including bypass units 77A and 77B.

In the FET rectification mode, control unit 90 controls each FET included in bypass units 77A and 77B to be turned ON/OFF so as to be synchronized with ON/OFF of the switching element in oscillation unit 74.

More specifically, in the FET rectification mode, each FET included in bypass units 77A and 77B is in an ON state in a time period of conduction of the diodes in rectification circuits 76A and 77B applied in the case where no FET is provided.

Control unit 90 performs switching between the diode rectification mode and the FET rectification mode based on each of the load current values detected by current detection units 78A and 78B. Thereby, it becomes possible to suppress fluctuation in the voltage output to 24V system load 81 that is not constant-voltage controlled, and more specifically, possible to suppress cross regulation. The reason thereof will be described in the following.

FIGS. 3A to 3C each are a diagram illustrating the diode rectification mode and the FET rectification mode according to the first embodiment. Referring to FIG. 3A, transformer T1 has a primary winding W1 and a secondary winding W2 that serves to supply a voltage to a 24V system load. In this case, the explanation about the secondary winding for supplying a voltage to a 5V system load will be described later for the purpose of facilitating easy understanding.

In the diode rectification mode, control unit 90 performs full-wave rectification of an AC voltage induced in secondary winding W2 in a path including diodes D6 and D7 corresponding to rectification circuit 76A. The secondary voltage induced in secondary winding W2 is decreased by a voltage drop Vd due to diodes D6 and D7, and then, supplied to the 24V system load. At this time, the FETs connected to both ends of each of diodes D6 and D7 are turned off.

On the other hand, in the FET rectification mode shown in FIG. 3B, control unit 90 performs full-wave rectification of the AC voltage induced in secondary winding W2 in a path including FET elements Q4 and Q5 corresponding to bypass unit 77A. More specifically, in synchronization with the timing of ON/OFF switching of oscillation unit 74 electrically connected to primary winding W1, control unit 90 alternately turns on and off these FET elements Q4 and Q5 in such a manner that one FET element is turned on while the other FET element is turned off. In addition, in order to prevent both of FET elements Q4 and Q5 from being simultaneously brought into an ON state, control unit 90 may be configured to provide a prescribed time interval between the time when one element is turned off and the time when the other element is then turned on.

The secondary voltage induced in secondary winding W2 in the FET rectification mode is decreased by a voltage drop Vf due to FET elements Q4 and Q5, and then, supplied to the 24V system load. At this time, voltage drop Vf caused due to FET elements Q4 and Q5 shows an extremely small value determined by the on-resistance in each of FET elements Q4 and Q5. Accordingly, voltage drop Vf caused due to FET elements Q4 and Q5 is significantly smaller than voltage drop Vd caused due to diodes D6 and D7.

By utilizing the difference between the voltage drop amounts (voltage drop Vd−voltage drop Vf) caused by the difference between the rectification modes, control unit 90 can control the magnitude of the voltage to be supplied to the 24V system load.

FIG. 3C is a diagram for illustrating a comparison between the diode rectification mode and the FET rectification mode. Referring to FIG. 3C, as described above, the voltage drop amount in the diode rectification mode depends on the capacitances of diodes D6 and D7 that are used, but is basically greater than the voltage drop amount in the FET rectification mode.

Also, in the diode rectification mode, diodes D6 and D7 each allow a current to automatically flow therethrough in the forward direction when a forward bias voltage exceeds a prescribed value. Accordingly, control unit 90 does not have to perform control in the diode rectification mode. On the other hand, in the FET rectification mode, control unit 90 needs to monitor the ON/OFF-switching timing of oscillation unit 74 to control the ON/OFF timing of FET elements Q4 and Q5 so as to be synchronized with the switching timing of oscillation unit 74.

Although described later in detail, also on the secondary winding side for supplying a voltage to the 5V system load, power supply device 70 has a configuration for performing switching between the diode rectification mode (the mode allowing conduction of the secondary AC current of transformer T1 in a path including rectification circuit 76B) and the FET rectification mode (the mode allowing conduction of the secondary AC current of transformer T1 in a path including bypass unit 77B).

(a4. Rectification Mode Switching Control)

Then, referring to FIGS. 4A to 4C, an explanation will be hereinafter given with regard to the control for switching the rectification mode in accordance with the load current flowing through each of the 24V system load and the 5V system load.

FIGS. 4A and 4B each show: the relation between the current flowing through the 24V load system (hereinafter referred to as a "24V output current") and the voltage supplied to the 24V load system (hereinafter referred to as a "24V output voltage") at the time when the current flowing through the 5V system load (hereinafter also referred to as a "5V output current") is relatively large (for example, 10 A); and the relation between the 24V output current and the 24V output voltage at the time when the 5V output current is relatively small (0.05 A).

FIG. 4A is a diagram showing the case where control unit 90 rectifies the secondary AC voltage on transformer T1 only in the diode rectification mode without using the FET rectification mode. Referring to FIG. 4A, when the 5V output current is 10 A, the 24V output voltage changes from 26.4V to 26.0V as the 24V output current becomes larger. Furthermore, when the 5V output current is 0.05 A, the 24V output voltage changes from 24.4V to 24.0V as the 24V output current becomes larger. In other words, in the present example, when only the diode rectification mode is used, the 24V output voltage changes from 24.0V to 26.4V, and its change width is 2.4V.

On the other hand, FIG. 4B is a diagram illustrating the case where control unit 90 performs switching between the diode rectification mode and the FET rectification mode to rectify the secondary AC voltage on transformer T1. More specifically, in the example in FIG. 4B, when the 5V output current exceeds 2.5 A, control unit 90 switches the rectification mode from the diode rectification mode using rectification circuit 76B to the FET rectification mode using bypass unit 77B. Also, when the 24V output current exceeds 2.5 A, control unit 90 switches the rectification mode from the diode rectification mode using rectification circuit 76A to the FET rectification mode using bypass unit 77A.

As shown in FIG. 4B, in the configuration for switching between the diode rectification mode and the FET rectification mode, the 24V output voltage changes from about 24.2V to about 25.0V, in which case its change width is less than 1.0V.

FIG. 4C is a diagram for illustrating a comparison between the 24V output voltage only in the diode rectification mode (corresponding to FIG. 4A) and the 24V output voltage in the case of switching between the diode rectification mode and the FET rectification mode (corresponding to FIG. 4B).

As apparent also from FIG. 4C, power supply device 70 according to the present embodiment can suppress cross regulation (fluctuation in the 24V output voltage) by switching between the diode rectification mode and the FET rectification mode. The above-described configuration can suppress cross regulation because of the following two configurations.

In the first configuration, the rectification mode for the secondary AC voltage induced in the 24V system that is not constant-voltage controlled (hereinafter also referred to as a "24V system secondary AC voltage") is switched between the diode rectification mode and the FET rectification mode. By way of example, an explanation will be hereinafter given with regard to the case where the 5V output current in FIG. 4C is relatively small (0.05 A) and the 24V output current is relatively large (10 A).

In the case where the 24V system secondary AC voltage is rectified only in the diode rectification mode, the 24V output voltage falls to 24.0V because the 24V output current is relatively large. On the other hand, when the 24V output current is relatively large (when exceeding a threshold value), control unit 90 according to the present embodiment switches the diode rectification mode to the FET rectification mode, and rectifies the 24V system secondary AC voltage. Thereby, the 24V output voltage can be raised from 24.0V to 24.4V by utilizing the difference between voltage drop Vd caused by the diode and voltage drop Vf caused by the FET.

In other words, by switching the rectification mode for the 24V system secondary AC voltage that is not constant-voltage controlled, control unit 90 according to the present embodiment can regulate the rise and fall of the 24V output voltage by the difference between the voltage drop amount caused by the diode and the voltage drop amount caused by the FET.

In the second configuration, the rectification mode for the secondary AC voltage induced in the 5V system that is constant-voltage controlled (hereinafter also referred to as a "5V system secondary AC voltage") is switched between the diode rectification mode and the FET rectification mode. By way of example, an explanation will be hereinafter given with regard to the case where the 5V output current in FIG. 4C is relatively large (10 A) and the 24V output current in FIG. 4C is relatively small (0.1 A).

In the case where the 5V system secondary AC voltage is rectified only in the diode rectification mode, the power supply efficiency of the 5V system is relatively low since voltage drop Vd caused by a diode is relatively large. Accordingly, the duty ratio of the switching operation of oscillation unit 74 that is PWM-controlled is increased. In response, the 24V output voltage is increased to 26.4V.

On the other hand, when the 5V output current is relatively large (when exceeding a threshold value), control unit 90 according to the present embodiment switches the diode rectification mode to the FET rectification mode, and rectifies the 5V system secondary AC voltage. Since voltage drop Vf caused by the FET is much smaller than voltage drop Vd caused by the diode, the power supply efficiency of the 5V system is raised. Thus, the duty ratio of the switching operation of oscillation unit 74 that is PWM-controlled is lowered. Thereby, the 24V output voltage can be lowered from 26.4V to 24.8V.

In other words, control unit 90 according to the present embodiment switches the rectification mode for the 5V system secondary AC voltage that is constant-voltage controlled, to thereby increase or decrease the duty ratio of oscillation unit 74 that is PWM-controlled, so that the rise and fall of the 24V output voltage can be regulated.

By combining the above-described two configurations, control unit 90 according to the present embodiment can suppress the fluctuation in the 24V output voltage that is not constant-voltage controlled, and more specifically, can suppress cross regulation.

In addition, even if one of the above-described two configurations is employed, the cross regulation can also be suppressed. FIG. 5 is a diagram showing a comparison of the fluctuation in the 24V output voltage among the case where only the diode rectification mode is used, the case where the FET rectification mode is used only at a 5V system secondary AC voltage, and the case where the FET rectification mode is used only at a 24V system secondary AC voltage.

As shown in FIG. 5, in the case where the FET rectification mode is used only at the 5V system secondary AC voltage and in the case where the FET rectification mode is used only at the 24V system secondary AC voltage, the fluctuation in the 24V output voltage is smaller than the fluctuation in the 24V output voltage in the case where only the diode rectification mode is used. In other words, cross regulation can be suppressed even if each of the above-described configurations is used alone.

Figure 6:
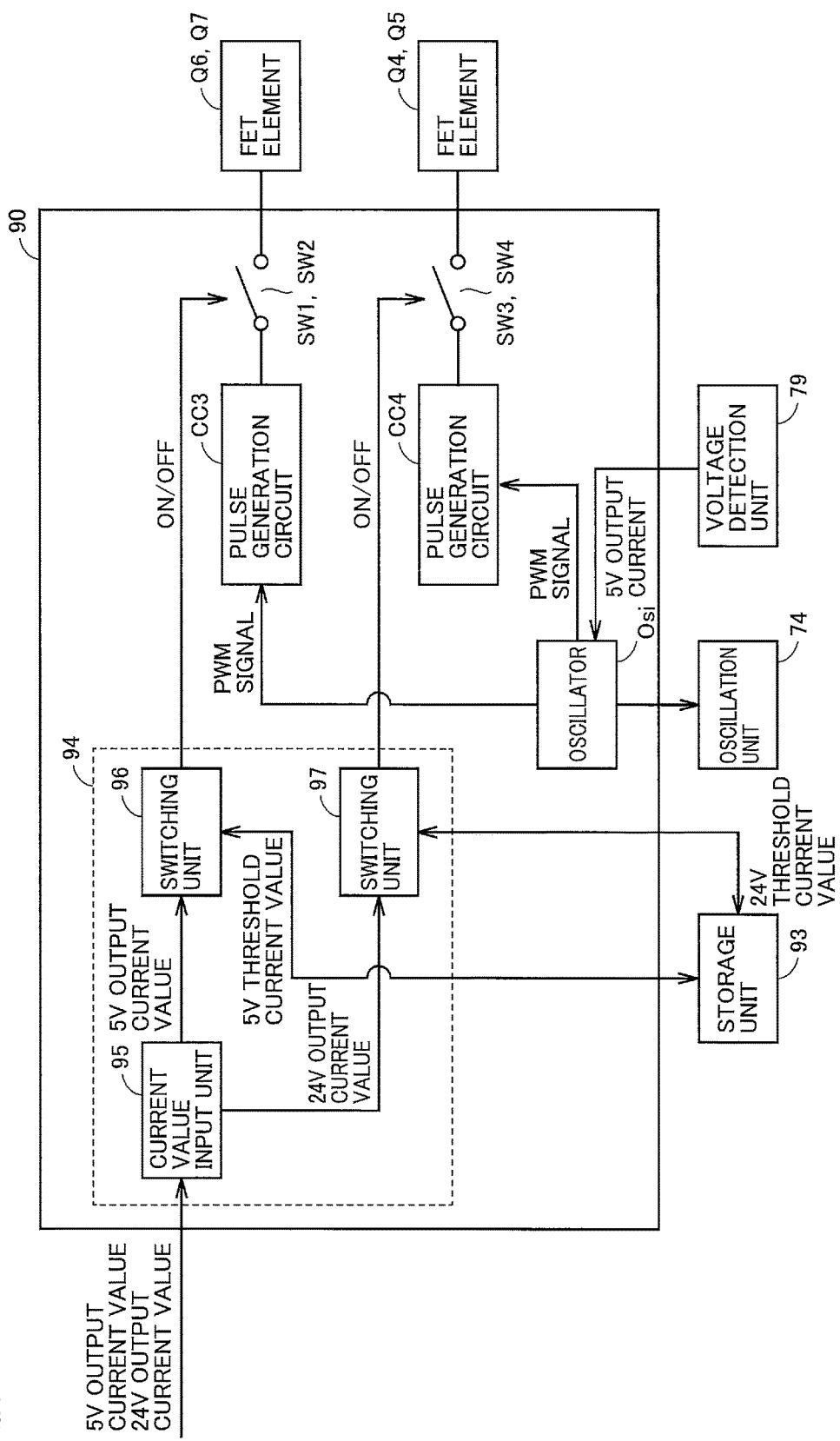
FIG. 6 is a block diagram illustrating the functional configuration of a control unit according to the first embodiment.

The functional configuration of control unit 90 for implementing the above-described series of controls will be hereinafter described FIG. 6 is a diagram illustrating the functional configuration of control unit 90. Referring to FIG. 6, control unit 90 has a main functional configuration including a main controller 94, pulse generation circuits CC3 and CC4, switches SW1 to SW4, and an oscillator Osi. Main controller 94 includes a current value input unit 95 and switching units 96 and 97.

Oscillator Osi receives an input of a 5V output voltage from voltage detection unit 79, sets the duty ratio so as to set the 5V output voltage at a 5V constant voltage, and outputs a PWM signal according to this duty ratio to oscillation unit 74 and pulse generation circuits CC3 and CC4.

Based on the input PWM signal, pulse generation circuit CC3 outputs a voltage pulse to each of FET elements Q6 and Q7 included in corresponding bypass unit 77A. This voltage pulse is equal to or greater than the gate voltage on each of these FET elements Q6 and Q7.

Based on the input PWM signal, pulse generation circuit CC4 similarly outputs a voltage pulse to each of FET elements Q4 and Q5 included in corresponding bypass unit 77B. This voltage pulse is equal to or greater than the gate voltage on each of these FET elements Q4 and Q5.

In response to inputs of these voltage pulses, FET elements Q4 to Q7 are controlled to be turned ON/OFF so as to be synchronized with ON/OFF of the switching element in oscillation unit 74.

Current value input unit 95 obtains a 24V output current value and a 5V output current value from current detection units 78A and 78B, respectively. Current value input unit 95 outputs the 5V output current value to switching unit 96, and outputs the 24V output current value to switching unit 97.

Switching unit 96 obtains a 5V threshold current value Ith5 (2.5 A in the present example) from a storage unit 93. When the 5V output current value input from current value input unit 95 exceeds 5V threshold current value Ith5, switching unit 96 turns on switches SW1 and SW2 arranged in the rear stage of pulse generation circuit CC3. Thereby, a voltage pulse is supplied from pulse generation circuit CC3 to each of FET elements Q6 and Q7. In other words, the rectification mode of the 5V system secondary AC voltage is set in the FET rectification mode.

On the other hand, switching unit 96 turns off switches SW1 and SW2 when the 5V output current value is equal to or less than a 5V threshold current value Ith5. This interrupts supply of the voltage pulse from pulse generation circuit CC3 to each of FET elements Q6 and Q7. In other words, the rectification mode of the 5V system secondary AC voltage is set in the diode rectification mode.

Switching unit 97 also performs the same control as that performed by switching unit 96. Specifically, switching unit 97 obtains a 24V threshold current value Ith24 (2.5 A in the present example) from storage unit 93. When the 24V output current value exceeds a 24V threshold current value Ith24, switching unit 97 turns on switches SW3 and SW4, thereby setting the rectification mode of the 24V system secondary AC voltage in the FET rectification mode. On the other hand, when the 24V output current value is equal to or less than 24V threshold current value Ith24, switching unit 96 turns off switches SW3 and SW4, thereby setting the rectification mode of the 5V system secondary AC voltage in the diode rectification mode.

Figure 7:
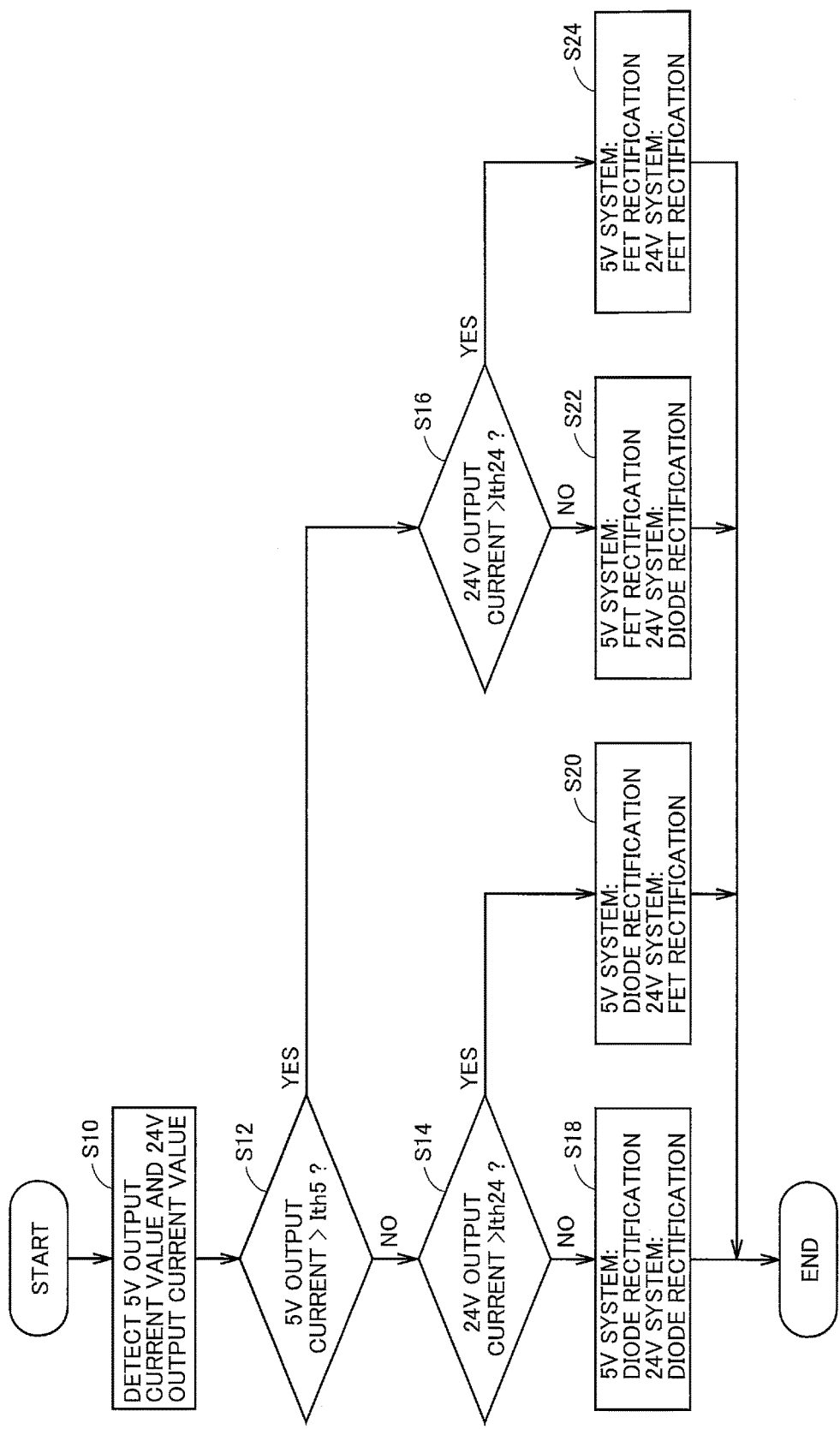
FIG. 7 is a flowchart illustrating switching control for the rectification mode according to the first embodiment.

The above-described series of controls will be described with reference to the flowchart shown in FIG. 7. FIG. 7 is a flowchart illustrating switching control for the rectification mode according to the first embodiment. The process shown in FIG. 7 is implemented when a processor included in control unit 90 executes a control program. In another aspect, some or all of the process may be performed by a circuit element and other hardware. The above-described premises are also the same in the flowchart shown in FIG. 7 and the subsequent figures.

Referring to FIG. 7, in step S10, control unit 90 detects the magnitude of each of the 24V output current and the 5V output current. More specifically, control unit 90 obtains the current value output from each of current detection units 78A and 78B shown in FIG. 2, that is, the magnitude of the current flowing through each of 24V system load 81 and 5V system load 82.

In step S12, control unit 90 determines whether the magnitude of the 5V output current exceeds a 5V threshold current value Ith5 or not.

When control unit 90 determines that the 5V output current is equal to or less than 5V threshold current value Ith5 (NO in step S12), it advances the process to step S14.

On the other hand, when control unit 90 determines that the 5V output current exceeds 5V threshold current value Ith5 (YES in step S12), it advances the process to step S16.

In steps S14 and S16, control unit 90 determines whether the magnitude of the 24V output current exceeds 24V threshold current value Ith24 or not.

When control unit 90 determines in step S14 that the 24V output current is equal to or less than 24V threshold current value Ith24 (NO in step S14), it advances the process to step S18. In step S18, control unit 90 sets the rectification mode of each of the 5V system secondary AC voltage and the 24V system secondary AC voltage in the diode rectification mode.

When control unit 90 determines in step S14 that the 24V output current exceeds 24V threshold current value Ith24 (YES in step S14), it advances the process to step S20. In step S20, control unit 90 sets the rectification mode of the 5V system secondary AC voltage in the diode rectification mode, and sets the rectification mode of the 24V system secondary AC voltage in the FET rectification mode.

When control unit 90 determines in step S16 that the 24V output current is equal to or less than 24V threshold current value Ith24 (NO in step S16), it advances the process to step S22. In step S22, control unit 90 sets the rectification mode of the 5V system secondary AC voltage in the FET rectification mode, and sets the rectification mode of the 24V system secondary AC voltage in the diode rectification mode.

When control unit 90 determines in step S16 that the 24V output current exceeds 24V threshold current value Ith24 (YES in step S16), it advances the process to step S24. In step S24, control unit 90 sets the rectification mode of each of the 5V system secondary AC voltage and the 24V system secondary AC voltage in the FET rectification mode.

According to the above description, based on the information showing the value of the current flowing through the load connected to each of the plurality of secondary windings, power supply device 70 according to the present embodiment can perform switching between the diode rectification mode and FET rectification mode. Thereby, the present power supply device 70 can suppress the voltage fluctuation in the 24V output voltage that is not constant-voltage controlled, and more specifically, can suppress cross regulation.

Furthermore, the present power supply device 70 is not configured to include a dummy resistance and the like in order to suppress cross regulation. Therefore, unnecessary power consumption in the resistance can be avoided. Consequently, the present power supply device 70 can implement high power supply efficiency.

(a5. Circuit Configuration of Power Supply Device 70)

Figure 8:
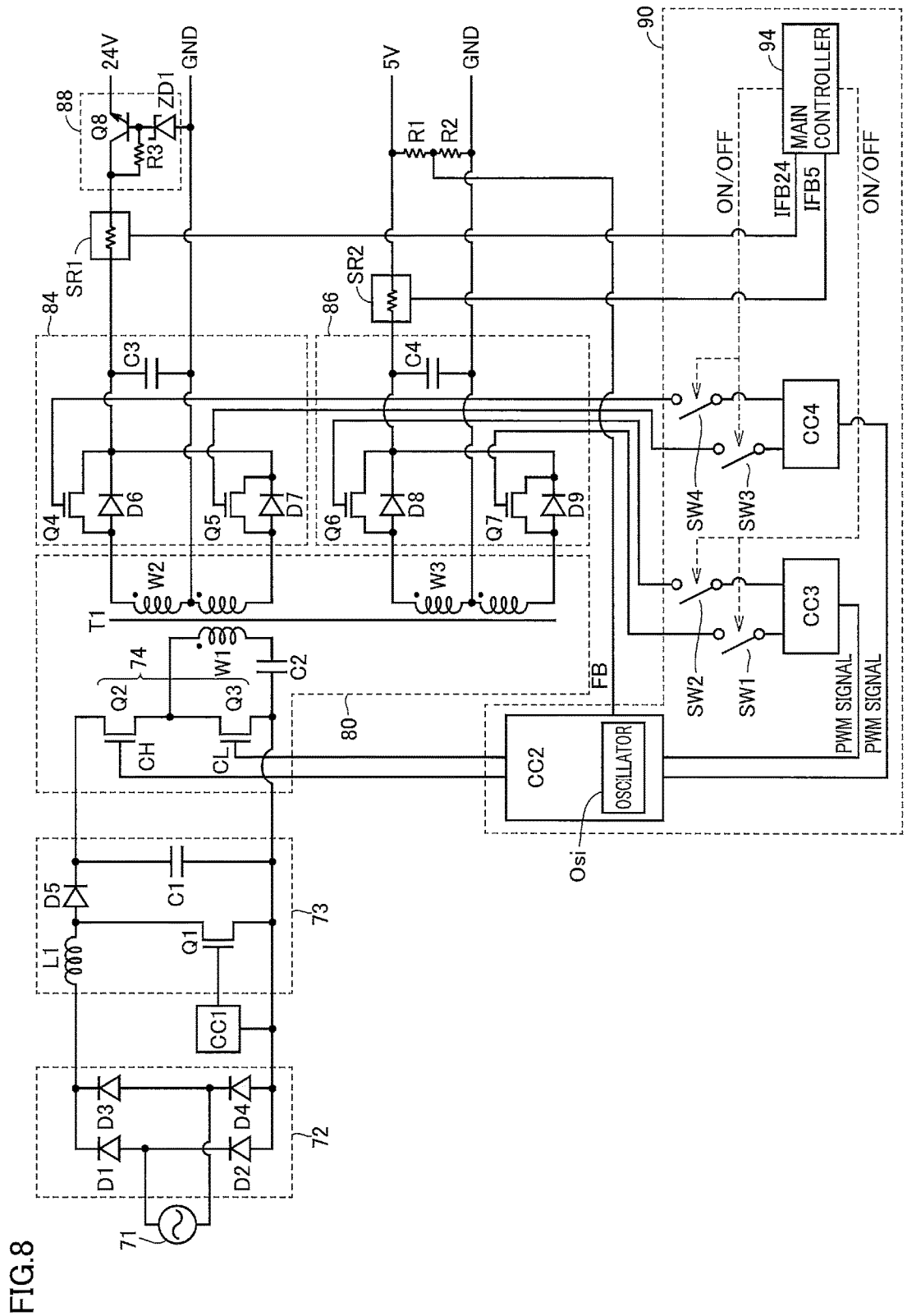
FIG. 8 is a diagram illustrating an example of the circuit configuration of the power supply device according to the first embodiment.

Referring to FIG. 8, an explanation will be hereinafter given with regard to an example of the circuit configuration for implementing the above-described power supply device. Referring to FIG. 8, the AC voltage output from AC power supply input unit 71 is full-wave rectified by rectification circuit 72 formed of diodes D1 to D4.

The pulsating flow output from rectification circuit 72 is input into power factor correction circuit 73 that is formed of a reactor L1, a switching element Q1, a diode D5, and a capacitor C1.

A power factor correction control circuit CC1 controls switching element Q1 to be turned on/off to boost the output voltage of power factor correction circuit 73 to a prescribed voltage. In the present embodiment, the prescribed voltage is defined as 220V by way of example. The following is an explanation about the voltage boosting operation of power factor correction circuit 73. When switching element Q1 is in the ON state, reactor L1 stores energy. When switching element Q1 is in the OFF state, the energy stored in reactor L1 is stored in capacitor C1 through diode D5. Power factor correction circuit 73 repeatedly turns on/off switching element Q1 so as to boost the voltage.

Then, the operation of DC/DC converter 80 will be explained. DC/DC converter 80 is provided as a DC/DC converter operated according to a series resonance scheme and formed of switching elements Q2, Q3, a resonance capacitor C2 and a transformer T1. Switching elements Q2 and Q3 correspond to oscillation unit 74 in FIG. 2.

A primary control circuit CC2 controls the duty ratios of switching elements Q2 and Q3, which are PWM-controlled, such that the output voltage from transformer T1 is set at a prescribed voltage value. More specifically, primary control circuit CC2 controls the duty ratio of the PWM signal output from oscillator Osi such that the 5V output voltage is set at a 5V constant voltage. Primary control circuit CC2 performs the above-described control based on the information about the voltage divided by resistances R1 and R2 corresponding to voltage detection unit 79, that is, based on the information associated with the magnitude of the voltage supplied to the 5V system load. In this case, primary control circuit CC2 controls switching elements Q2 and Q3 in such a manner that one switching element is in the ON state while the other switching element is in the OFF state. In addition, DC/DC converter 80 is not limited to a series resonance-type converter, but may be a forward-type converter, a flyback-type converter, and the like.

Main controller 94 performs control as to whether the secondary AC current induced in secondary winding W2 of transformer T1 is rectified in a path including diodes D6 and D7 corresponding to rectification circuit 76A or in a path including FET elements Q4 and Q5 corresponding to bypass unit 77A.

Main controller 94 obtains information IFB24 showing the magnitude of the 24V output current from the voltage drop amount by a current detection element SR1 corresponding to current detection unit 78A. Based on the information, main controller 94 determines whether the 24V system secondary AC voltage is rectified in the diode rectification mode or in the FET rectification mode.

When the 24V system secondary AC voltage is rectified in the FET rectification mode, main controller 94 turns on switches SW3 and SW4 arranged in the rear stage of pulse generation circuit CC4. When switches SW3 and SW4 are turned on, the voltage pulse output from pulse generation circuit CC4 is supplied to each of FET elements Q4 and Q5. The voltage pulse is output at the same duty ratio as the duty ratio of the PWM signal that is output from oscillator Osi included in primary control circuit CC2. Thereby, FET elements Q4 and Q5 are controlled to be turned on and off in synchronization with the timing at which switching elements Q2 and Q3 are turned on and off.

On the other hand, when the 24V system secondary AC voltage is rectified in the diode rectification mode, main controller 94 turns off switches SW3 and SW4. Thereby, the 24V system secondary AC voltage is rectified by diodes D6 and D7.

Furthermore, control unit 90 performs the same control as that performed in the above-described 24V system also for the AC voltage induced in secondary winding W3 of transformer T1.

Main controller 94 obtains information IFB5 showing the magnitude of the 5V output current from the voltage drop amount by a current detection element SR2 corresponding to current detection unit 78B. Based on the information, main controller 94 determines whether the 5V system secondary AC voltage is rectified in the diode rectification mode or in the FET rectification mode.

When the 5V system secondary AC voltage is rectified in the FET rectification mode, main controller 94 turns on switches SW1 and SW2 arranged in the rear stage of pulse generation circuit CC3. When switches SW1 and SW2 are turned on, the voltage pulse output from pulse generation circuit CC3 is supplied to each of FET elements Q6 and Q7. This voltage pulse is output at the same duty ratio as the duty ratio of the PWM signal that is output from oscillator Osi. Thereby, FET elements Q6 and Q7 are controlled to be turned on and off in synchronization with the timing at which switching elements Q2 and Q3 are turned on and off.

On the other hand, when the 5V system secondary AC voltage is rectified in the diode rectification mode, main controller 94 turns off switches SW1 and SW2. Thereby, the 5V system secondary AC voltage is rectified by diodes D8 and D9.

The secondary AC voltages induced in secondary windings W2 and W3 are rectified in any of the rectification modes and then smoothed by capacitors C3 and C4, respectively.

The voltage smoothed by capacitor C3 is input into an upper limiter circuit 88 formed of a resistance R3, a transistor Q8 and a Zener diode ZD1. Upper limiter circuit 88 suppresses that an overvoltage is supplied to the 24V system load.

Transistor Q8 has an emitter provided on the 24V output voltage side. Resistance R3 has one end connected to the collector of transistor Q8, and has the other end connected to the base of transistor Q8. Zener diode ZD1 has a cathode connected to the base of transistor Q8 and an anode connected to the ground potential.

When the DC voltage having been smoothed in capacitor C3 exceeds a prescribed voltage determined by the Zener potential of Zener diode ZD1, a current flows through Zener diode ZD1. Thereby, upper limiter circuit 88 suppresses that an overvoltage is supplied to the 24V system load.

In another aspect, the upper limiter circuit is not limited to the configuration shown in FIG. 8, but may be configured to include a Zener diode that is reverse-connected between output voltages, and an element that interrupts the output path in response to conduction of the Zener diode.

According to the above description, power supply device 70 in the present embodiment can perform switching between the diode rectification mode and the FET rectification mode based on the information that shows the value of the current flowing through the load connected to each of the plurality of secondary windings W2 and W3. Thereby, the present power supply device 70 can suppress the voltage fluctuation in the 24V output voltage that is not constant-voltage controlled, and more specifically, can suppress cross regulation.

Furthermore, the present power supply device 70 is not configured to include a dummy resistance and the like in the 24V system that is not constant-voltage controlled for the purpose of suppressing cross regulation. Accordingly, unnecessary power consumption in the resistance can be avoided. Consequently, the present power supply device 70 can implement high power supply efficiency.

B. Second Embodiment: Control Based on Output Voltage that is not Constant-Voltage Controlled In the first embodiment, an explanation has been given with regard to the configuration in which the rectification mode is switched based on the load current (a 5V output current and a 24V output current). In the following description of the second to fifth embodiments, an explanation will be given with regard to the configuration in which the rectification mode is switched based on other parameters.

In the present embodiment, an explanation will be given with regard to the configuration and control for switching the rectification mode based on the magnitude of the 24V output voltage that is not constant-voltage controlled. In addition, since power supply device 70A according to the present embodiment is approximately the same as power supply device 70 in the first embodiment, only different points therebetween will be hereinafter described.

(b1. Control Flow)

Figure 9:
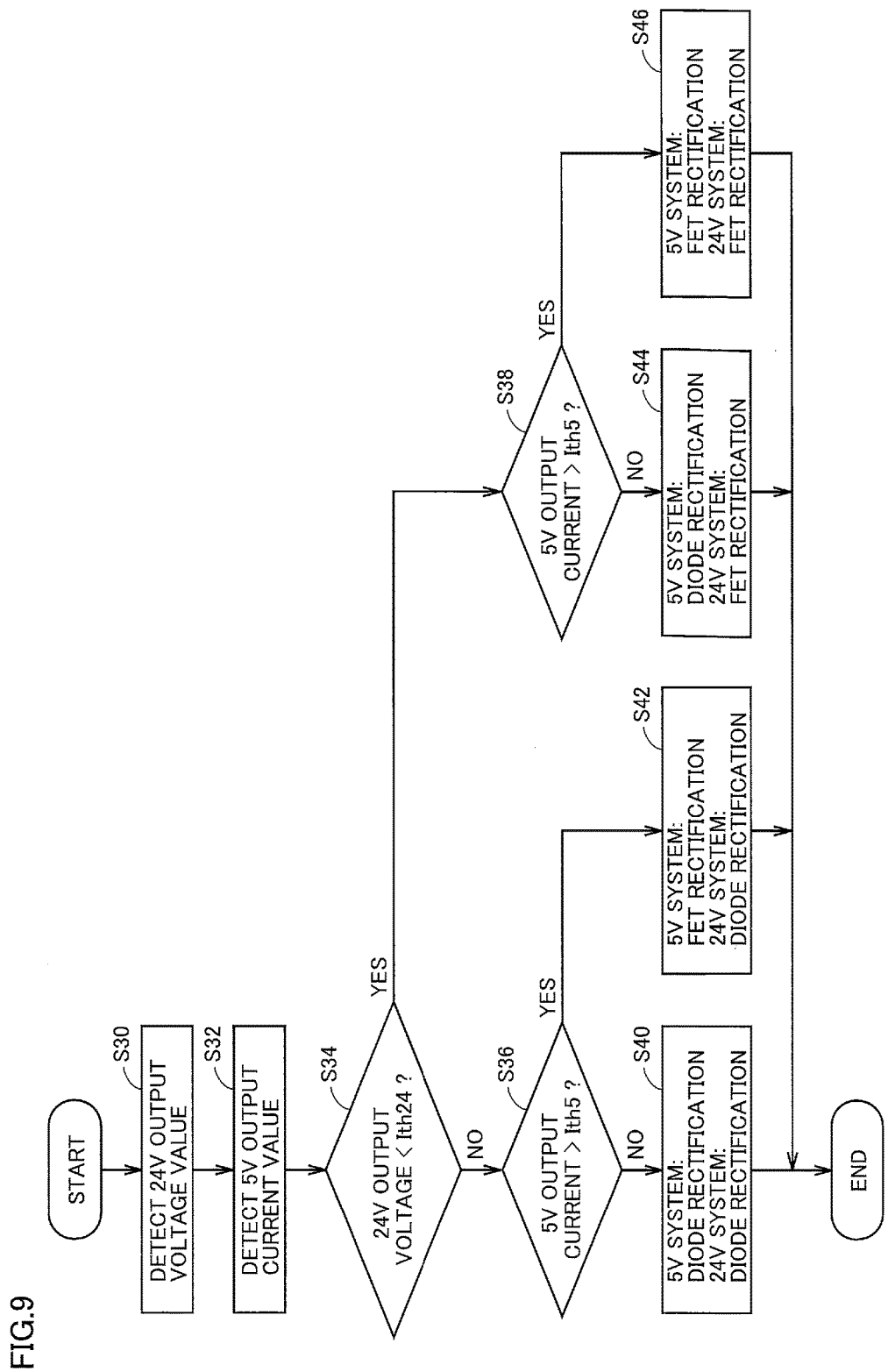
FIG. 9 is a flowchart illustrating switching control for the rectification mode according to the second embodiment.

FIG. 9 is a diagram illustrating switching control for the rectification mode according to the second embodiment. Referring to FIG. 9, in step S30, a control unit 90A included in power supply device 70A obtains the information showing the magnitude of the 24V output voltage.

Then in step S32, control unit 90A obtains the information showing the magnitude of the 5V output current.

In step S34, control unit 90A determines whether the 24V output voltage is lower than a 24V threshold voltage value Vth24 or not. In this case, 24V threshold voltage value Vth24 is assumed to be a 24V output voltage value at the time when the 5V output current is a 5V threshold current value Ith5 by way of example. When control unit 90A determines that the 24V output voltage is equal to or greater than 24V threshold voltage value Vth24 (NO in step S34), it advances the process to step S36. On the other hand, when control unit 90A determines that the 24V output voltage is lower than 24V threshold voltage value Vth24 (YES in step S34), it advances the process to step S38.

In steps S36 and S38, control unit 90A determines whether the magnitude of the 5V output current exceeds 5V threshold current value Ith5 or not. The prescribed current value is defined as 2.5 A by way of example.

When control unit 90A determines in step S36 that the 5V output current is equal to or less than 5V threshold current value Ith5 (NO in step S36), it advances the process to step S40. In step S40, control unit 90A sets the rectification mode of each of the 5V system secondary AC voltage and the 24V system secondary AC voltage in the diode rectification mode.

When control unit 90A determines in step S36 that the 5V output current exceeds 5V threshold current value Ith5 (YES in step S36), it advances the process to step S42. In step S42, control unit 90A sets the rectification mode of the 5V system secondary AC voltage in the FET rectification mode, and sets the rectification mode of the 24V system secondary AC voltage in the diode rectification mode.

When control unit 90A determines in step S38 that the 5V output current is equal to or less than 5V threshold current value Ith5 (NO in step S38), it advances the process to step S44. In step S44, control unit 90A sets the rectification mode of the 5V system secondary AC voltage in the diode rectification mode, and sets the rectification mode of the 24V system secondary AC voltage in the FET rectification mode.

When control unit 90A determines in step S38 that the 5V output current exceeds 5V threshold current value Ith5 (YES in step S38), it advances the process to step S46. In step S46, control unit 90A sets the rectification mode of each of the 5V system secondary AC voltage and the 24V system secondary AC voltage in the FET rectification mode.

According to the above description, power supply device 70A of the present embodiment can perform switching between the diode rectification mode and the FET rectification mode based on the information showing the values of the voltage and the current supplied to the load connected to each of the plurality of secondary windings. Thereby, the present power supply device 70A can suppress the voltage fluctuation in the 24V output voltage that is not constant-voltage controlled, and more specifically, can suppress cross regulation.

Furthermore, the present power supply device 70A is not configured to include a dummy resistance and the like for the purpose of suppressing cross regulation. Accordingly, unnecessary power consumption in the resistance can be avoided. Consequently, the present power supply device 70A can implement high power supply efficiency.

(b2. Circuit Configuration of Power Supply Device 70A)

The circuit configuration for implementing the above-described power supply device 70A will be hereinafter described with reference to FIG. 10. In addition, since the portions corresponding to those in power supply device 70 shown in FIG. 8 are designated by the same reference characters, the description thereof will not be repeated.

Figure 10:
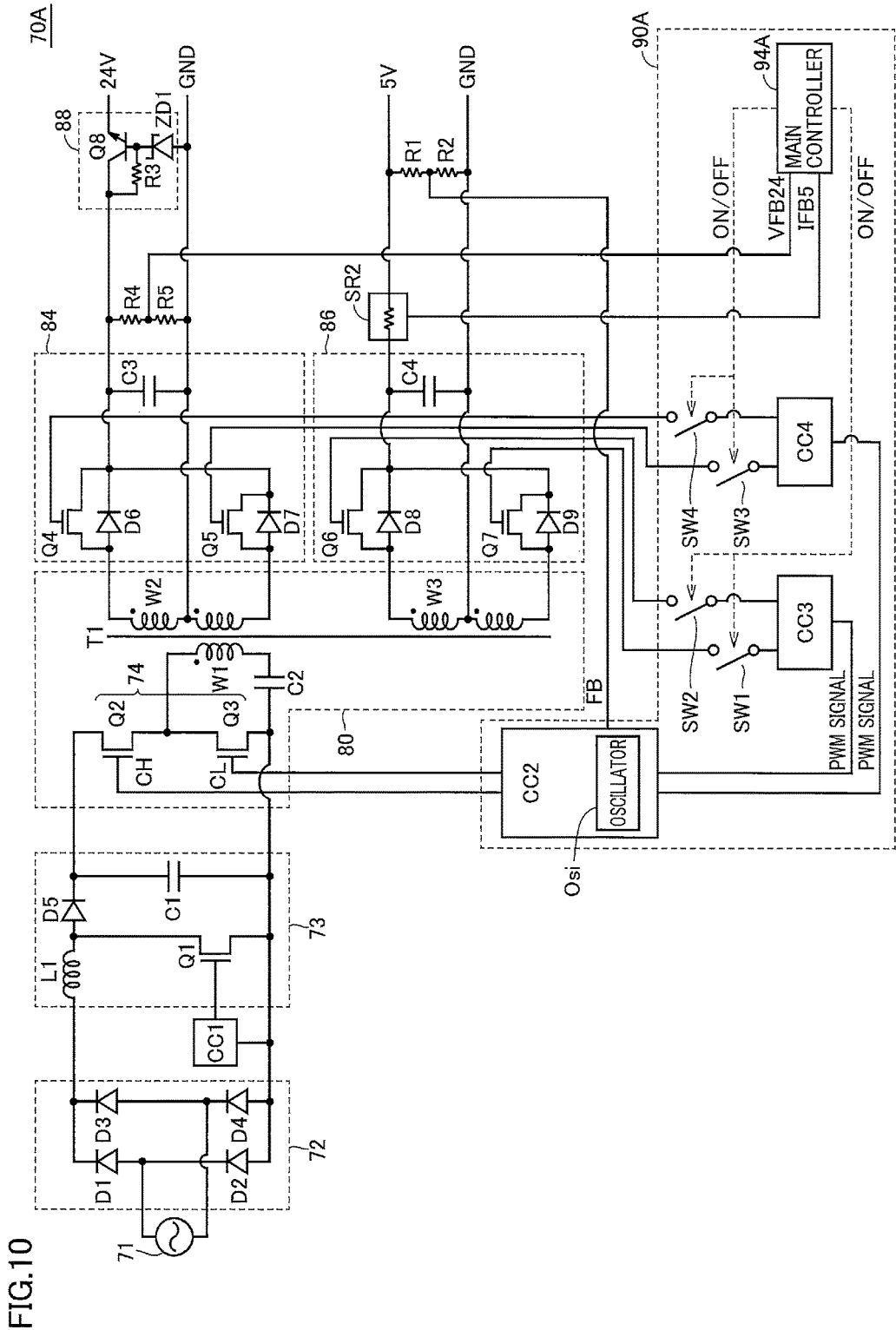
FIG. 10 is a diagram illustrating an example of the circuit configuration of a power supply device according to the second embodiment.

Referring to FIG. 10, power supply device 70A is provided with resistances R3 and R4 that are arranged between the output potential smoothed in capacitor C3 and the ground potential. Main controller 94A obtains the information about the voltage divided by resistances R3 and R4, that is, information VFB24 associated with the magnitude of the voltage to be supplied to the 24V system load.

In another aspect, power supply device 70A may determine the rectification mode of the 5V system secondary AC voltage based on the 24V output voltage in place of the 5V output current. Specifically, when the 24V output voltage is lower than 24V threshold voltage value Vth24, one of the 24V system secondary AC voltage and the 5V system secondary AC voltage is rectified in the FET rectification mode.

In this case, when the 24V output voltage is still lower than 24V threshold voltage value Vth24, control unit 90A switches the rectification mode of each of the 24V system secondary AC voltage and the 5V system secondary AC voltage from the diode rectification mode to the FET rectification mode or from the FET rectification mode to the diode rectification mode.

Also in this state, when the 24V output voltage is still lower than 24V threshold voltage value Vth24, control unit 90A sets the rectification mode of each of the 24V system secondary AC voltage and the 5V system secondary AC voltage in the FET rectification mode.

According to the above description, power supply device 70A can suppress the output fluctuation (cross regulation) of the 24V output voltage even if current detection element SR2 for obtaining information IFB5 showing the magnitude of the 5V output current is not provided.

C. Third Embodiment: Control Based on Primary-Side Switching Duty Ratio

Switching element Q2 (and Q3) included in oscillation unit 74 is PWM-controlled by the control unit. The greater the ON/OFF duty ratio of the switching element is, the larger the 5V output current is. Thus, in the present embodiment, the configuration and control for switching the rectification mode will be hereinafter explained based on the duty ratio of the switching element. In addition, since power supply device 70B according to the present embodiment is approximately the same as power supply device 70 in the first embodiment, only different points therebetween will be described.

(c1. Control Flow)

Figure 11:
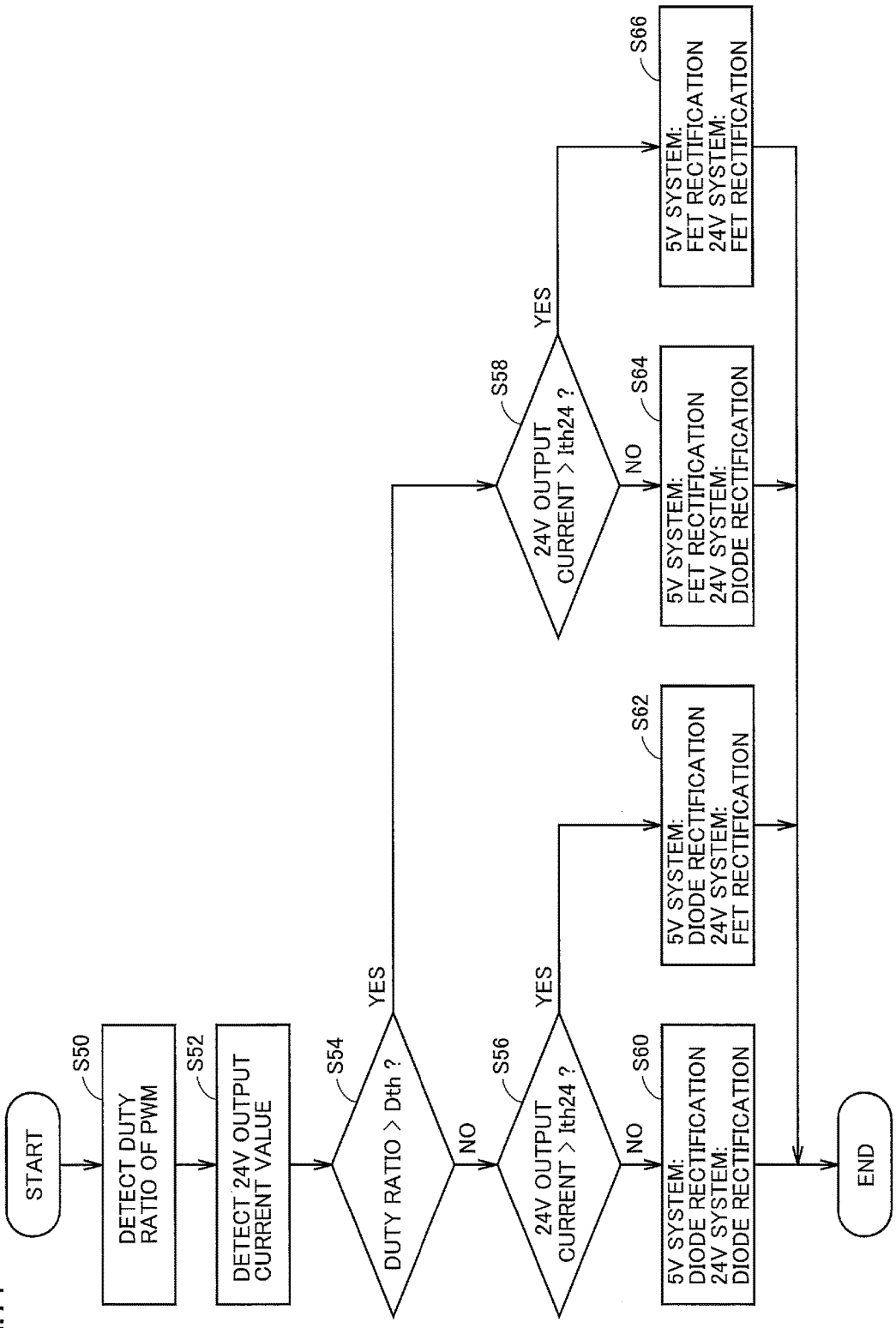
FIG. 11 is a flowchart illustrating switching control for the rectification mode according to the third embodiment.

FIG. 11 is a diagram illustrating switching control for the rectification mode according to the third embodiment. Referring to FIG. 11, in step S50, control unit 90B included in power supply device 70B detects the duty ratio of switching element Q2 (and Q3) that is PWM-controlled.

Then, in step S52, control unit 90B obtains the information showing the magnitude of the 24V output current.

In step S54, control unit 90B determines whether the duty ratio of switching element Q2 exceeds a threshold duty ratio Dth or not. When control unit 90B determines that the duty ratio of switching element Q2 is equal to or less than threshold duty ratio Dth (NO in step S54), it advances the process to step S56. On the other hand, when control unit 90B determines that the duty ratio of switching element Q2 exceeds threshold duty ratio Dth (YES in step S54), it advances the process to step S58.

In steps S56 and S58, control unit 90B determines whether the magnitude of the 24V output current exceeds 24V threshold current value Ith24 or not. A prescribed current value is defined as 2.5 A by way of example.

When control unit 90B determines in step S56 that the 24V output current is equal to or less than 24V threshold current value Ith24 (NO in step S56), it advances the process to step S60. In step S60, control unit 90B sets the rectification mode of each of the 5V system secondary AC voltage and the 24V system secondary AC voltage in the diode rectification mode.

When control unit 90B determines in step S56 that the 24V output current exceeds 24V threshold current value Ith24 (YES in step S56), it advances the process to step S62. In step S62, control unit 90B sets the rectification mode of the 5V system secondary AC voltage in the diode rectification mode, and sets the rectification mode of the 24V system secondary AC voltage in the FET rectification mode.

When control unit 90B determines in step S58 that the 24V output current is equal to or less than 24V threshold current value Ith24 (NO in step S58), it advances the process to step S64. In step S64, control unit 90B sets the rectification mode of the 5V system secondary AC voltage in the FET rectification mode, and sets the rectification mode of the 24V system secondary AC voltage in the diode rectification mode.

When control unit 90B determines in step S58 that the 24V output current exceeds 24V threshold current value Ith24 (YES in step S58), it advances the process to step S66. In step S66, control unit 90B sets the rectification mode of each of the 5V system secondary AC voltage and the 24V system secondary AC voltage in the FET rectification mode.

According to the above description, power supply device 70B of the present embodiment can perform switching between the diode rectification mode and the FET rectification mode based on the information showing: the value of the current supplied to the load connected to each of the plurality of secondary windings; and the duty ratio of switching element Q2 (and Q3) that is connected to the primary winding of transformer T1 and PWM-controlled. Thereby, the present power supply device 70B can suppress the voltage fluctuation in the 24V output voltage that is not constant-voltage controlled, and more specifically, can suppress cross regulation.

Furthermore, the present power supply device 70B is not configured to include a dummy resistance and the like for the purpose of suppressing cross regulation. Accordingly, unnecessary power consumption in the resistance can be avoided. Consequently, the present power supply device 70B can implement high power supply efficiency.

(c2. Circuit Configuration of Power Supply Device 70B)

The circuit configuration for implementing the above-described power supply device 70B will be hereinafter described with reference to FIG. 12. In addition, since the portions corresponding to those in power supply device 70 shown in FIG. 8 are designated by the same reference characters, the description thereof will not be repeated.

A voltage detection element SR4 is provided at the branch portion in 5V system side secondary winding W3 between FET element Q7 and diode D9. A main controller 94B is electrically connected to voltage detection element SR4.

By monitoring the rectangular wave-shaped voltage waveform obtained by voltage detection element SR4, main controller 94B can indirectly obtain the duty ratio of switching element Q2. Also in another aspect, main controller 94B may obtain the duty ratio of switching element Q2 based on the PWM signal that is output from oscillator Osi included in primary control circuit CC2.

In still another aspect, when setting the control mode of the 24V system secondary AC voltage, power supply device 70B may be configured to use information VFB24 associated with the magnitude of the 24V output voltage as in the second embodiment.

D. Fourth Embodiment: Control Based on Primary-Side Switching Frequency

In the above-described first to third embodiments, an explanation has been given with regard to the configuration in which the control unit performs PWM control of switching element Q2 (Q3) connected to the primary-side winding of transformer T1. In the present embodiment, the control unit performs PFM control for controlling the switching frequency of the switching element.

In this case, the greater the switching frequency (oscillation frequency) of switching element Q2 is, the larger the 5V output current is. Thus, in the present embodiment, an explanation will be hereinafter given with regard to the configuration and control for switching the rectification mode based on the switching frequency of the switching element. In addition, since power supply device 70C according to the present embodiment is approximately the same as power supply device 70B in the third embodiment, only different points therebetween will be hereinafter described.

Figure 13:
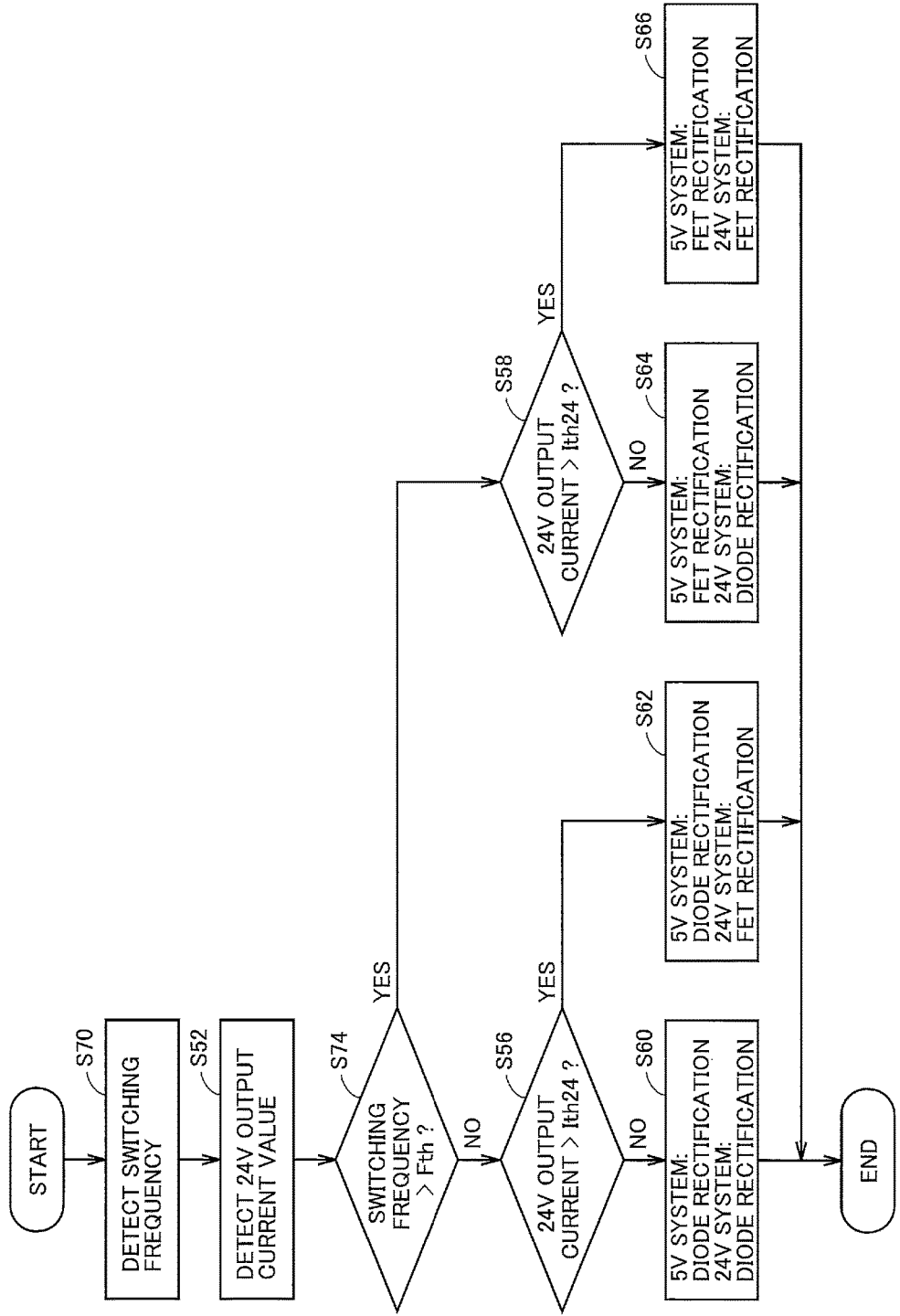
FIG. 13 is a flowchart illustrating switching control for the rectification mode according to the fourth embodiment.

FIG. 13 is a flowchart illustrating the switching control for the rectification mode according to the fourth embodiment. In addition, since the portions corresponding to those in shown in FIG. 11 are designated by the same reference characters, the description thereof will not be repeated.

Referring to FIG. 13, in step S70, control unit 90C included in power supply device 70C detects the switching frequency of switching element Q2 (and Q3) that is PFM-controlled.

Then, in step S52, control unit 90B obtains the information showing the magnitude of the 24V output current.

In step S74, control unit 90C determines whether the switching frequency of switching element Q2 exceeds a threshold frequency Fth or not. When control unit 90C determines that the switching frequency of switching element Q2 is equal to or less than threshold frequency Fth (NO in step S74), it advances the process to step S56. On the other hand, when control unit 90C determines that the switching frequency of switching element Q2 exceeds threshold frequency Fth (YES in step S74), it advances the process to step S58.

According to the above description, power supply device 70C of the present embodiment can perform switching between the diode rectification mode and the FET rectification mode based on the information showing: the value of the current supplied to the load connected to each of the plurality of secondary windings, and the switching frequency of switching element Q2 (and Q3) that is connected to the primary winding of transformer T1 and PFM-controlled. Thereby, the present power supply device 70C can suppress the voltage fluctuation in the 24V output voltage that is not constant-voltage controlled, and more specifically, can suppress cross regulation.

Furthermore, the present power supply device 70C is not configured to include a dummy resistance and the like for the purpose of suppressing cross regulation. Accordingly, unnecessary power consumption in the resistance can be avoided. Consequently, the present power supply device 70C can implement high power supply efficiency.

Figure 12:
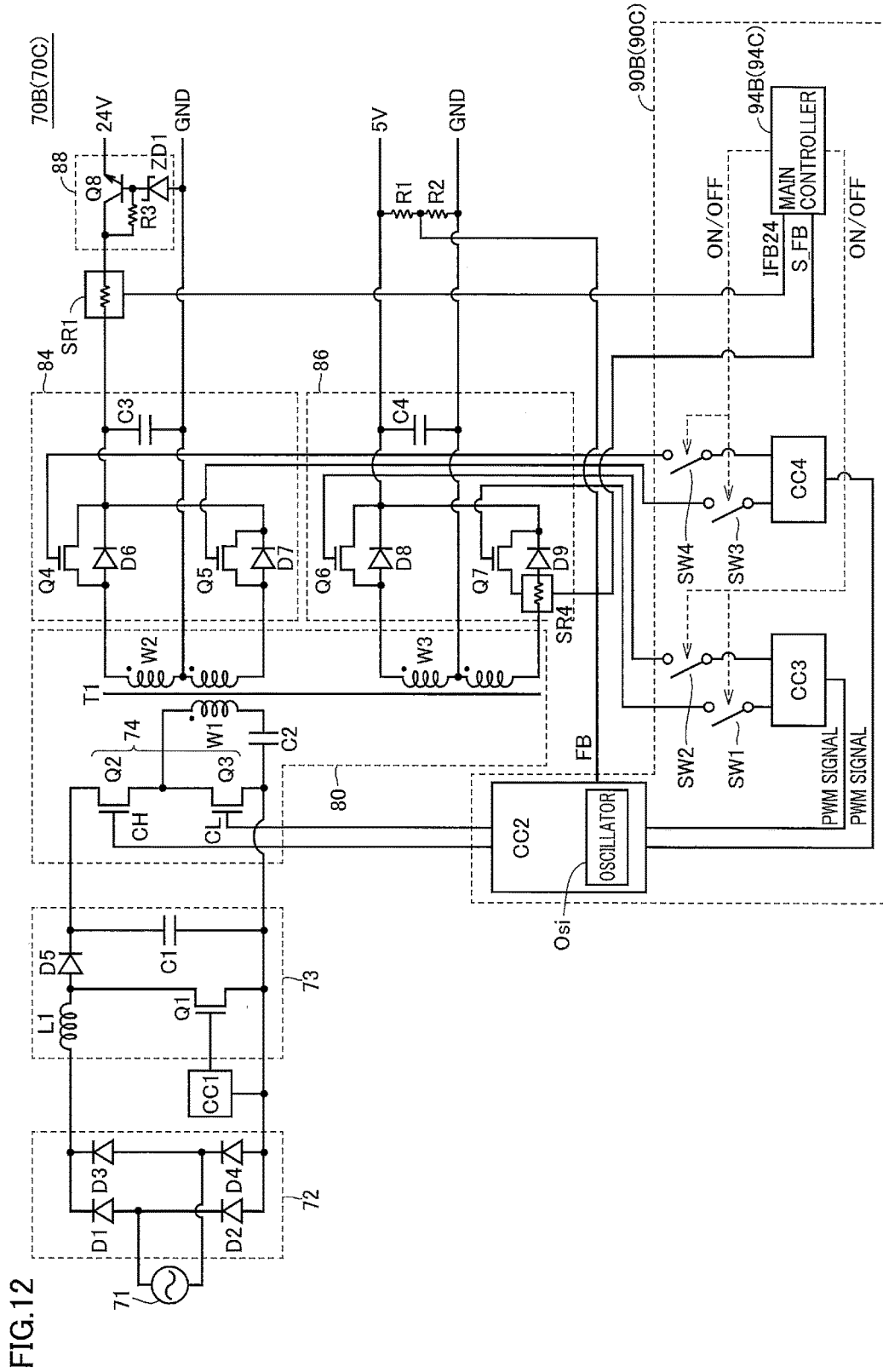
FIG. 12 is a diagram illustrating an example of the circuit configuration of a power supply device according to the third embodiment.

The circuit configuration of power supply device 70C according to the present embodiment is the same as the configuration of power supply device 70B shown in FIG. 12. Main controller 94C monitors the voltage waveform obtained by voltage detection element SR4. Thereby, main controller 94C counts the number of rectangular wave-shaped pulses per unit time period, to obtain the information showing the switching frequency of switching element Q2.

In still another aspect, when setting the control mode of the 24V system secondary AC voltage, power supply device 70C may be configured to use information VFB24 associated with the magnitude of the 24V output voltage as in the second embodiment.

In still another aspect, power supply device 70C may be configured to perform switching between PFM control and PWM control based on the value of the current flowing through the load. More specifically, power supply device 70C may be configured to perform PFM control when the value of the current flowing through the load is equal to or less than a prescribed current value, and to perform PWM control when the value of the current flowing through the load is greater than a prescribed current value. Thereby, the switching loss during the light load conditions can be reduced, so that a more efficient power supply device can be implemented.

E. Fifth Embodiment: Control Based on Instructions

In the above-described embodiment, the control unit performs control for switching the rectification mode based on the parameters such as a current value in the state where the power supply device is operated. In the present embodiment, an explanation will be hereinafter given with regard to the configuration and control in which the control unit switches the rectification mode based on the input of instructions for a print job and the like.

A user outputs an instruction to power supply device 70D according to the present embodiment using an operation panel or the like that is not shown. In this case, the "instruction" means an order (a command) to image forming apparatus 100, for example, which includes setting changes (for example, changes of the reading resolution in a scanner 65) and the like.

In this case, 24V system load 81 and 5V system load 82 each include a device configured to perform an operation according to an instruction. A control unit 90D included in power supply device 70D receives an input of an instruction from a user, and specifies the device (for example, scanner 65 and the like) that is operated in response to the instruction. In this case, control unit 90D determines whether the devices to be operated include an optional device or not.

An optional device means accessory equipment that can be added to image forming apparatus 100. For example, an automatic document feeder 200 serving as an external device corresponds to such an optional device.

When such an optional device is used, the load current is increased. Thus, in the present embodiment, the rectification mode is switched based on whether the optional device is used or not.

Figure 14:
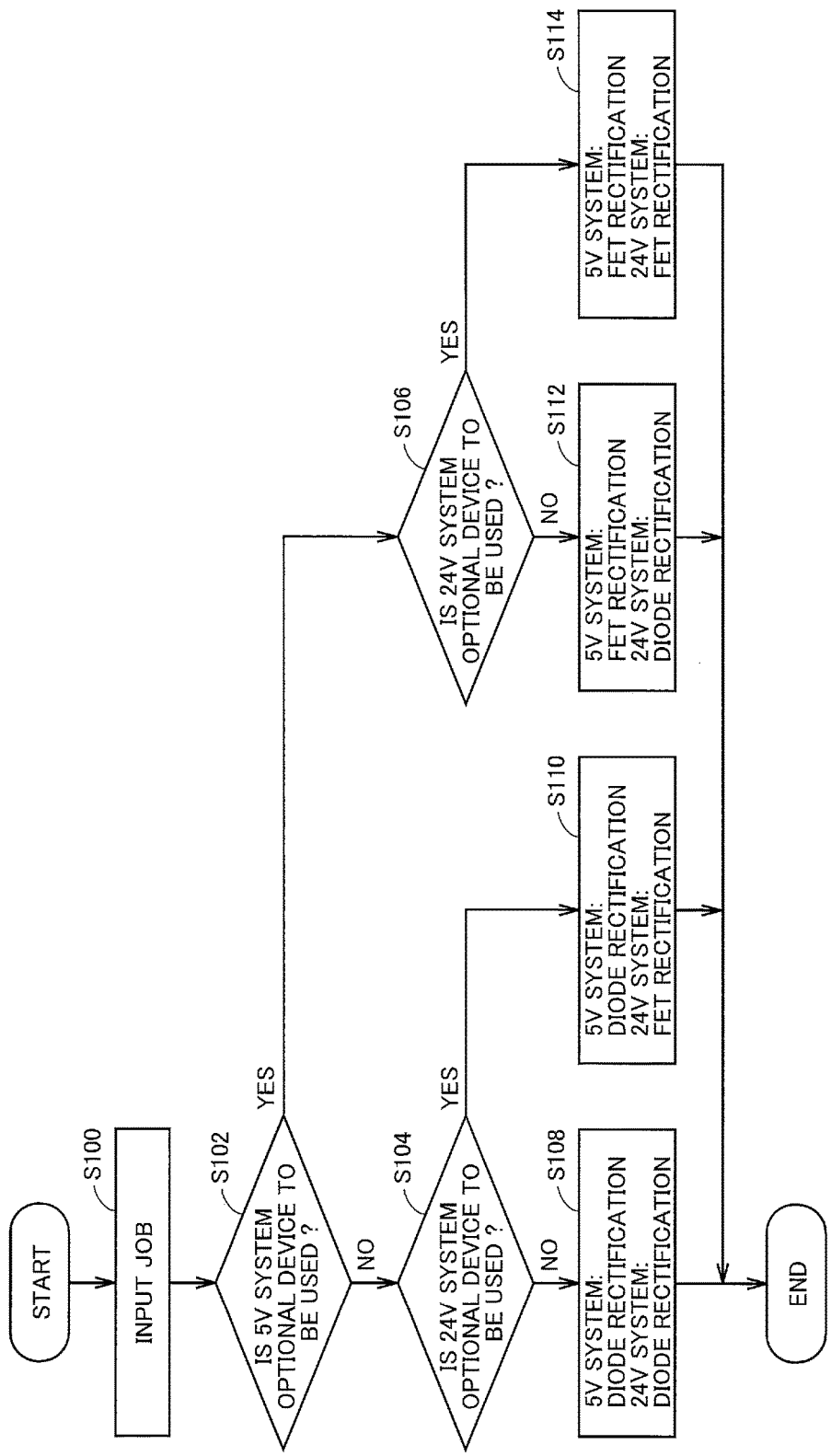
FIG. 14 is a flowchart illustrating switching control for the rectification mode according to the fifth embodiment.

FIG. 14 is a diagram illustrating switching control for the rectification mode according to the fifth embodiment. Referring to FIG. 14, control unit 90D receives an input of a job (an instruction) in step S100. Then in step S102, control unit 90D determines whether a 5V system optional device is to be used or not in the job. Examples of the 5V system optional device may be devices such as an additional memory, an HDD (Hard Disk Drive) and the like.

When control unit 90D determines that the 5V system optional device is not used (No in step S102), it advances the process to step S104. On the other hand, when control unit 90D determines that the 5V system optional device is used (YES in step S102), it advances the process to step S106.

Control unit 90D determines in steps S104 and 106 whether the 24V system optional device is to be used or not in the input job. Examples of the 24V system optional devices may be devices such as automatic document feeder 200, sheet supply cassette 30, and post-processing devices (not shown) having a book-binding function and a sheet-binding function.

When control unit 90D determine in step S104 that the 24V system optional device is not used (NO in step S104), it advances the process to step S108. In step S108, control unit 90D sets the rectification mode of each of the 5V system secondary AC voltage and the 24V system secondary AC voltage in the diode rectification mode.

When control unit 90B determines in step S104 that the 24V system optional device is to be used (YES in step S104), it advances the process to step S110. In step S110, control unit 90D sets the rectification mode of the 5V system secondary AC voltage in the diode rectification mode, and sets the rectification mode of the 24V system secondary AC voltage in the FET rectification mode.

When control unit 90D determines in step S106 that the 24V system optional device is not used (NO in step S106), it advances the process to step S112. In step S112, control unit 90D sets the rectification mode of the 5V system secondary AC voltage in the FET rectification mode, and sets the rectification mode of the 24V system secondary AC voltage in the diode rectification mode.

When control unit 90D determines in step S106 that the 24V system optional device is to be used (YES in step S106), it advances the process to step S114. In step S114, control unit 90D sets the rectification mode of each of the 5V system secondary AC voltage and the 24V system secondary AC voltage in the FET rectification mode.

According to the above description, power supply device 70D of the present embodiment can switch the rectification mode based on the information about the device corresponding to each of power supply systems (5V system and 24V system) among the devices responding to the instructions. Thereby, the present power supply device 70D can suppress the voltage fluctuation in the 24V output voltage that is not constant-voltage controlled, and more specifically, can suppress cross regulation.

The power supply device shown in each of the above-described first to fourth embodiments switches the rectification mode based on the magnitude and the like of the current flowing through the load after power supply to the load is started. Accordingly, the 24V output voltage that is not constant-voltage controlled greatly fluctuates for a slight amount of time elapsed since the power supply has been started.

On the other hand, the present power supply device 70D can switch the rectification mode before the device included in the load performs the operation according to the instruction (before supplying electric power to the device responding to the instruction). Accordingly, the present power supply device 70D can suppress cross regulation more than that in the case of the power supply device shown in each of the above-described first to fourth embodiments.

In still another aspect, control unit 90D may be configured to predict the magnitude of the 24V output current and/or the 5V output current based on the input of the instruction, and, when these output current values exceed their respective threshold current values, rectify each of the secondary AC voltages in the FET rectification mode.

F. Modification

Although a modification will be hereinafter described using power supply device 70 according to the first embodiment, the features of this modification can be applicable also to the power supply device according to each of other embodiments. Furthermore, any combinations of the modifications described below can be applicable to the power supply device according to each of the above-described first to fifth embodiments.

(f1. Energy Saving Mode)

Image forming apparatus 100 implements an energy saving mode for suppressing power consumption. The energy saving mode means the mode in which electric power is supplied only to a 5V system load to which the output voltage equal to or less than other output voltages (24V output voltage) is supplied.

Image forming apparatus 100 is switched from the normal mode to the energy saving mode when it does not receive an input of an instruction from the user for a prescribed time period (for example, 3 minutes), by way of example.

When power supply device 70 receives an input of the control signal from image forming apparatus 100 showing that this image forming apparatus 100 has been switched to the energy saving mode, this power supply device 70 sets the rectification mode of the 5V system secondary AC voltage in the FET rectification mode. This is for the purpose of improving the power supply efficiency in the energy saving mode (during the light load conditions).

FIG. 15 is a flowchart illustrating the control in the energy saving mode. Referring to FIG. 15, control unit 90 determines in step S120 whether image forming apparatus 100 has been set in the energy saving mode or not. When control unit 90 determines that it receives an input of a control signal from image forming apparatus 100 showing that image forming apparatus 100 has been switched to the energy saving mode (YES in step S120), this control unit 90 sets the rectification mode of the 5V system secondary AC voltage in the FET rectification mode in step S122. On the other hand, when control unit 90 determines that image forming apparatus 100 has not been set in the energy saving mode (NO in step S120), control unit 90 ends a series of processes.

According to the above description, the power supply device of the present modification can improve the power supply efficiency in the energy saving mode.

(f2. Control and Configuration of Power Supply Device)

In the above-described embodiment, transformer T1 of power supply device 70 has a two-output configuration for one input. In another aspect, transformer T1 may be configured to have three or more outputs. In this case, power supply device 70 only has to be configured such that at least one output is constant-voltage controlled while at least one output is not constant-voltage controlled. Furthermore, the output of power supply device 70 may be configured to include two systems of 5V outputs and the like, for example, in such a manner that the output voltages overlap each other.

Also in the above description, power supply device 70 has a configuration in which an FET element for the FET rectification mode is arranged in the secondary winding corresponding to each output, but the present invention is not limited thereto. In another aspect, power supply device 70 may have a configuration in which an FET element for the FET rectification mode is arranged in the secondary winding corresponding to an optional output. Also in this configuration, the fluctuation in the output voltage that is not constant-voltage output controlled can be suppressed.

G. Summary

In the above-described first to fourth embodiments, the power supply device switches the rectification mode based on the information showing: the magnitudes of the current and the voltage supplied to a load corresponding to each of the power supply systems (a 5V system and a 24V system); the duty ratio of the switching element connected to the primary winding of the transformer; and the switching frequency. In other words, the power supply device switches the rectification mode based on the information showing the magnitude of the electric power supplied to the load corresponding to each of the power supply systems. In addition, the information showing the magnitude of electric power is not limited only to the above-described parameters, but may be parameters influencing the magnitude of the electric power supplied to the load corresponding to each of the power supply systems.

Furthermore, in the above-described fifth embodiment, the power supply device switches the rectification mode based on the information about the device corresponding to each of the power supply systems among the devices responding to instructions, in other words, based on the information showing the magnitude of the electric power that is to be later supplied to the load corresponding to each of the power supply systems.

Thereby, by utilizing the difference between the voltage drop amount in the diode rectification mode and the voltage drop amount in the FET rectification mode, the power supply device according to the above-described embodiment can suppress the fluctuation (cross regulation) in the voltage that is output from the power supply system and not constant-voltage controlled.

Furthermore, the power supply device according to the above-described embodiment is not configured to include a dummy resistance and the like for the purpose of suppressing cross regulation. Accordingly, unnecessary power consumption in the resistance can be avoided. Consequently, the power supply device according to the above-described embodiment can implement high power supply efficiency.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A power supply device comprising:
   a transformer including a primary winding and a plurality of secondary windings;
   an oscillator circuit including a switching element electrically connected to the primary winding, the oscillator circuit being configured to apply an AC voltage generated by a switching operation of the switching element to the primary winding; and
   a plurality of rectification circuits electrically connected to the plurality of secondary windings, respectively,
   each of the plurality of rectification circuits including a rectification element configured to rectify an AC voltage induced in a corresponding one of the plurality of secondary windings for supplying the rectified AC voltage to a corresponding load among a plurality of loads,
   the plurality of rectification circuits including a first rectification circuit having a bypass element connected to both ends of the rectification element, the bypass element being smaller in voltage drop amount during conduction than the rectification element,
   the power supply device further comprising:
   a first control unit configured to control the switching operation of the switching element in the oscillator circuit based on a signal associated with a magnitude of a voltage supplied from one of the plurality of rectification circuits to a corresponding load among the plurality of loads; and
   a switching unit configured to perform switching between a first mode and a second mode,
      in the first mode, an AC voltage induced in one of the plurality of secondary windings corresponding to the first rectification circuit being rectified in a path including the rectification element, and
      in the second mode, the AC voltage induced in one of the plurality of secondary windings corresponding to the first rectification circuit being rectified in a path including the bypass element,
   the switching unit being configured to perform switching from the first mode to the second mode upon satisfaction of a condition based on at least one of information showing a magnitude of electric power that is being supplied from each of the plurality of rectification circuits to a corresponding load among the plurality of loads and information showing a magnitude of electric power that is to be supplied from each of the plurality of rectification circuits to a corresponding load among the plurality of loads.

2. The power supply device according to claim 1, further comprising a current detection device configured to detect a magnitude of a current that is being supplied to a corresponding load among the plurality of loads from the first rectification circuit, wherein
   the switching unit is configured to perform switching from the first mode to the second mode when a value of a current detected by the current detection device exceeds a prescribed current value.

3. The power supply device according to claim 1, further comprising a voltage detection device configured to detect a signal associated with a magnitude of a voltage that is being supplied to a corresponding load among the plurality of loads from a rectification circuit different from a rectification circuit corresponding to a load among the plurality of loads for which the first control unit controls a voltage to be supplied, wherein
   the switching unit is configured to perform switching from the first mode to the second mode when a value of a voltage detected by the voltage detection device is lower than a prescribed voltage value.

4. The power supply device according to claim 1, wherein
   the first control unit includes a PWM control unit configured to control the switching element to be turned on and off by outputting a PWM signal to the switching element, and
   the first control unit is configured to perform switching from the first mode to the second mode when a duty ratio of the PWM signal exceeds a prescribed duty ratio.

5. The power supply device according to claim 1, further comprising a frequency detection device configured to detect a switching frequency of the switching element, wherein
   the switching unit is configured to perform switching from the first mode to the second mode when a frequency detected by the frequency detection device exceeds a prescribed frequency.

6. The power supply device according to claim 1, wherein
   each of the plurality of loads includes a device configured to perform an operation according to an instruction, and
   based on information about a device included in a load corresponding to the first rectification circuit among loads each responding to the instruction among the plurality of loads, the switching unit is configured to perform switching between the first mode and the second mode before the device included in the load responding to the instruction performs the operation according to the instruction.

7. The power supply device according to claim 1, further comprising a resonance capacitor connected in series to the primary winding.

8. The power supply device according to claim 1, wherein a converter including the transformer and the oscillator circuit is a flyback-type converter.

9. The power supply device according to claim 1, further comprising a power factor correction circuit configured to boost a DC voltage and output the DC voltage boosted by the power factor correction circuit to the oscillator circuit.

10. The power supply device according to claim 1, wherein
at least one rectification circuit of the plurality of rectification circuits that is different from a rectification circuit corresponding to a load among the plurality of loads for which the first control unit controls a voltage to be supplied includes
a Zener diode that is reverse-connected between output voltages, and
an element configured to interrupt an output path in response to conduction of the Zener diode.

11. An image forming apparatus including a power supply device, the power supply device comprising:
a transformer including a primary winding and a plurality of secondary windings;
an oscillator circuit including a switching element electrically connected to the primary winding, the oscillator circuit being configured to apply an AC voltage generated by a switching operation of the switching element to the primary winding; and
a plurality of rectification circuits electrically connected to the plurality of secondary windings, respectively,
each of the plurality of rectification circuits including a rectification element configured to rectify an AC voltage induced in a corresponding one of the plurality of secondary windings for supplying the rectified AC voltage to a corresponding load among a plurality of loads,
the plurality of rectification circuits including a first rectification circuit having a bypass element connected to both ends of the rectification element, the bypass element being smaller in voltage drop amount during conduction than the rectification element,
the power supply device further comprising:
a first control unit configured to control the switching operation of the switching element in the oscillator circuit based on a signal associated with a magnitude of a voltage supplied from one of the plurality of rectification circuits to a corresponding load among the plurality of loads; and
a switching unit configured to perform switching between a first mode and a second mode,
in the first mode, an AC voltage induced in one of the plurality of secondary windings corresponding to the first rectification circuit being rectified in a path including the rectification element, and
in the second mode, the AC voltage induced in one of the plurality of secondary windings corresponding to the first rectification circuit being rectified in a path including the bypass element,
the switching unit being configured to perform switching from the first mode to the second mode upon satisfaction of a condition based on at least one of information showing a magnitude of electric power that is being supplied from each of the plurality of rectification circuits to a corresponding load among the plurality of loads and information showing a magnitude of electric power that is to be supplied from each of the plurality of rectification circuits to a corresponding load among the plurality of loads.

12. The image forming apparatus according to claim 11, wherein
the voltage supplied to a load corresponding to the first rectification circuit among the plurality of loads is equal to or less than a voltage supplied to a load corresponding to each of the plurality of rectification circuits other than the first rectification circuit,
the power supply device is configured to be capable of implementing an energy saving mode in which electric power is supplied only to the load corresponding to the first rectification circuit, and
the switching unit is configured to perform control by the second mode in the energy saving mode.

* * * * *